(12) United States Patent
Takeda et al.

(10) Patent No.: US 11,461,005 B2
(45) Date of Patent: Oct. 4, 2022

(54) DISPLAY SYSTEM, DISPLAY CONTROL METHOD, AND INFORMATION STORAGE MEDIUM

(71) Applicant: Rakuten Group, Inc., Tokyo (JP)

(72) Inventors: Seiichi Takeda, Tokyo (JP); Ryohei Takuma, Tokyo (JP); Kaori Yoshimura, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/094,189

(22) Filed: Nov. 10, 2020

(65) Prior Publication Data
US 2021/0141529 A1    May 13, 2021

(30) Foreign Application Priority Data

Nov. 11, 2019 (JP) .............................. JP2019-204182

(51) Int. Cl.
G06F 3/0488 (2022.01)
G06F 3/04886 (2022.01)
G09G 5/38 (2006.01)

(52) U.S. Cl.
CPC .......... *G06F 3/04886* (2013.01); *G09G 5/38* (2013.01); *G09G 2340/0464* (2013.01)

(58) Field of Classification Search
CPC ....... G06F 3/147; G06F 3/04886; G09G 5/38; G09G 2340/0492; G09G 2354/00; G09G 2340/0464
See application file for complete search history.

(56) References Cited

U.S. PATENT DOCUMENTS

| 2006/0197753 | A1* | 9/2006 | Hotelling | G06F 3/0485 345/173 |
| 2011/0057880 | A1* | 3/2011 | Kasahara | G06F 1/1626 345/158 |

(Continued)

FOREIGN PATENT DOCUMENTS

| JP | 2011-059781 A | 3/2011 |
| JP | 2012-521034 A | 9/2012 |

(Continued)

OTHER PUBLICATIONS

Communication dated Jan. 19, 2021 from the Japanese Patent Office in application No. 2019-204183.

(Continued)

*Primary Examiner* — Abbas I Abdulselam
(74) *Attorney, Agent, or Firm* — Sughrue Mion, PLLC

(57) ABSTRACT

A control unit includes a posture detecting unit that detects inclination of an electronic device to a horizontal plane perpendicular to a gravitational direction by using output of a sensor mounted on the electronic device, and a position selecting unit that selects a position to display a touch operation area, which is an area for receiving a touch operation to the touch screen. The position selecting unit selects the position to display the touch operation area from a right position and a left position away from each other in a lateral direction of the touch screen based on the inclination (angle) of a lateral axis to the horizontal plane. According to this structure, when operating the electronic device having the touch screen with one hand, a user can display the touch operation area at an appropriate position by an intuitive operation.

13 Claims, 21 Drawing Sheets

(56) References Cited

U.S. PATENT DOCUMENTS

| | | |
|---|---|---|
| 2013/0171971 A1 | 7/2013 | Fujii et al. |
| 2013/0293470 A1 | 11/2013 | Kwon |
| 2013/0307801 A1 | 11/2013 | Nam |
| 2013/0326420 A1 | 12/2013 | Liu et al. |
| 2015/0149941 A1 | 5/2015 | Itagaki et al. |
| 2018/0053490 A1* | 2/2018 | Kimura .................... G09G 5/38 |
| 2018/0143751 A1 | 5/2018 | Liu et al. |
| 2018/0143796 A1 | 5/2018 | Murakawa et al. |
| 2019/0108620 A1* | 4/2019 | Homma ................ G06F 1/1694 |
| 2019/0324568 A1 | 10/2019 | Nam |

FOREIGN PATENT DOCUMENTS

| | | |
|---|---|---|
| JP | 2013-235568 A | 11/2013 |
| JP | 2014032478 A | 2/2014 |
| JP | 2014-197334 A | 10/2014 |
| JP | 2015-102943 A | 6/2015 |
| JP | 2015-518221 A | 6/2015 |
| JP | 2015-518984 A | 7/2015 |
| JP | 5923982 B2 | 5/2016 |
| JP | 2018084858 A | 5/2018 |
| JP | 2019-096182 A | 6/2019 |
| WO | 2010/110550 A1 | 9/2010 |

OTHER PUBLICATIONS

Communication dated Jan. 19, 2021 from the Japanese Patent Office in application No. 2019-204182.

Communication dated Jun. 8, 2021, from the Japanese Patent Office in application No. 2019204182.

Communication dated Sep. 21, 2021, from the Japanese Patent Office in application No. 2019-204183.

* cited by examiner

FIG.5
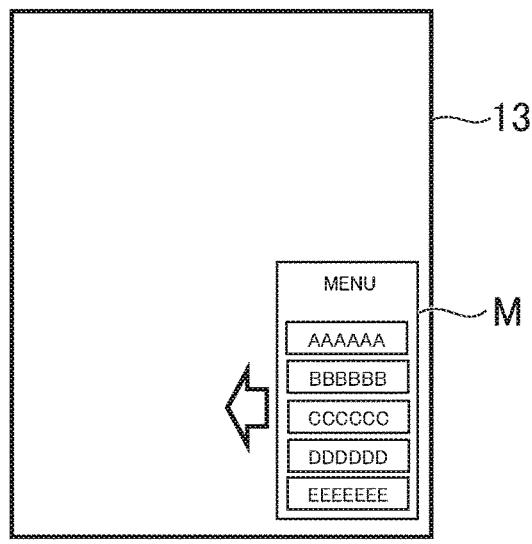
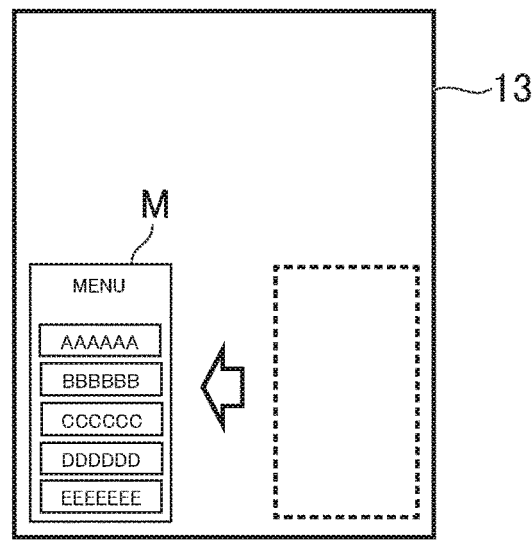
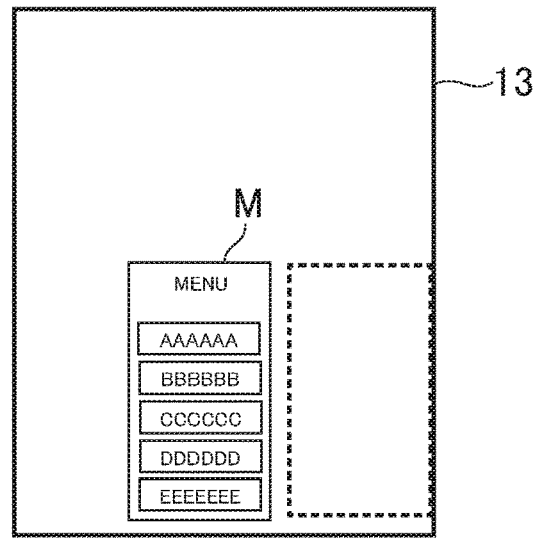

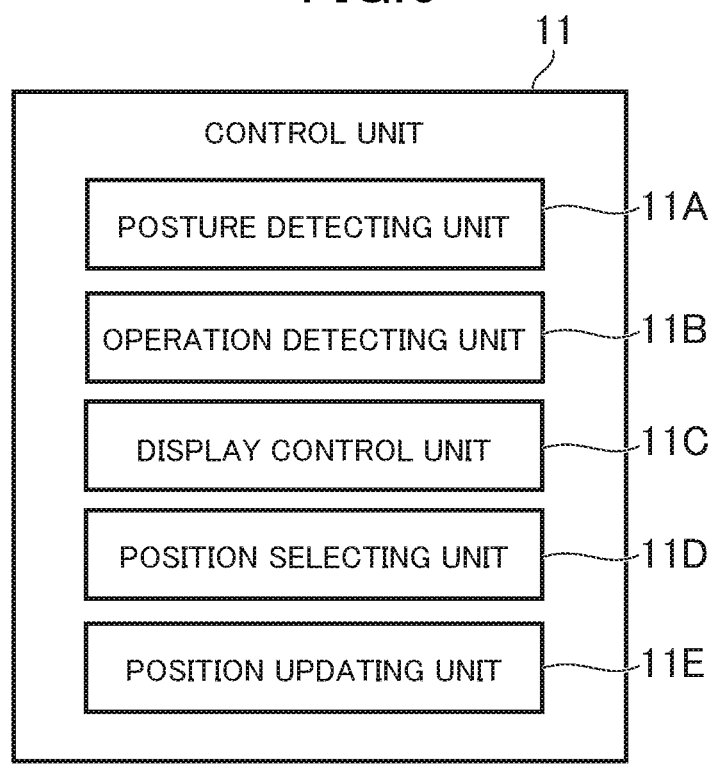

FIG.14A
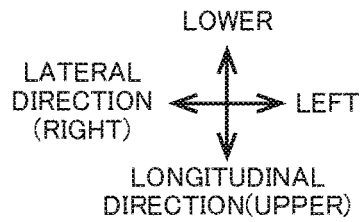
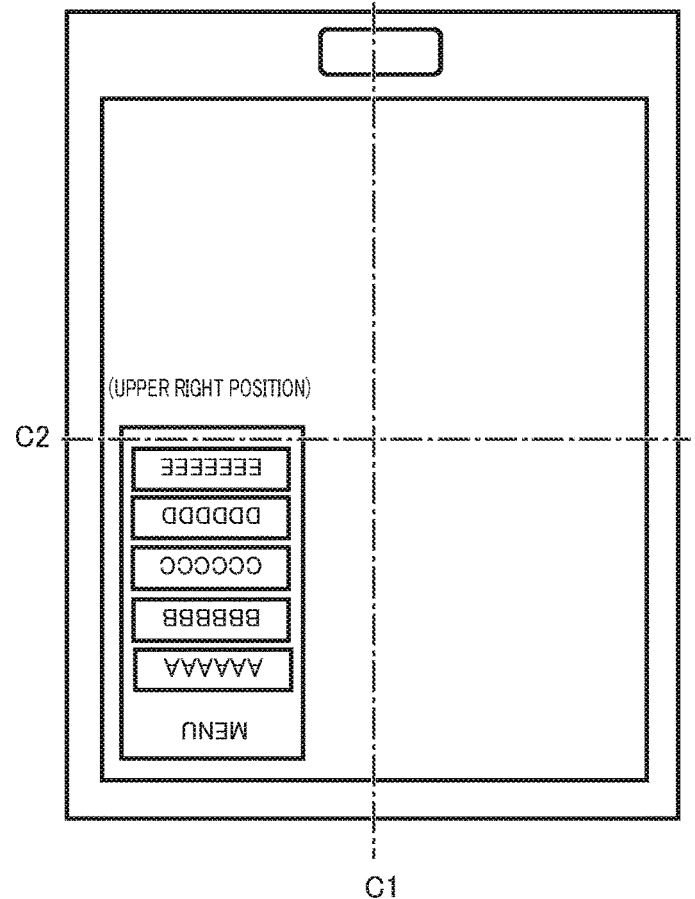
FIG.14B
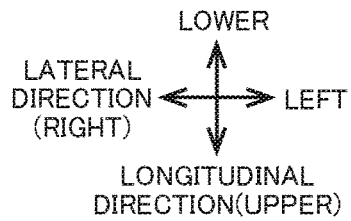
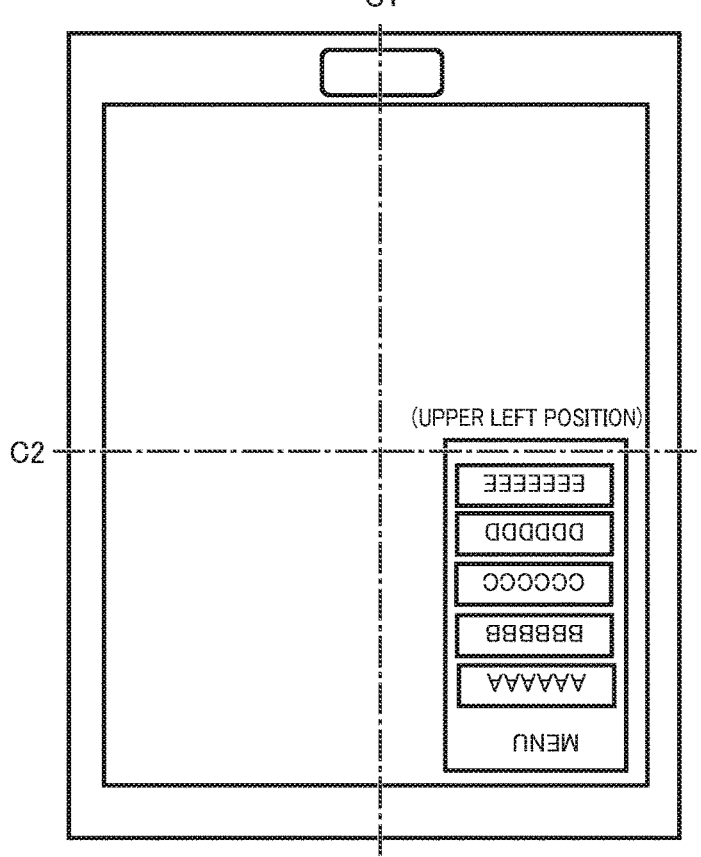

DISPLAY SYSTEM, DISPLAY CONTROL METHOD, AND INFORMATION STORAGE MEDIUM

CROSS-REFERENCE TO RELATED APPLICATION

The present application claims priority from Japanese application JP 2019-204182 filed on Nov. 11, 2019, the content of which is hereby incorporated by reference into this application.

BACKGROUND OF THE INVENTION

1. Field of the Invention

The present disclosure relates to a display system, a display control method, and an information storage medium.

2. Description of the Related Art

Many portable electronic devices, such as mobile phones and tablet terminals, are equipped with a touch screen including a display unit and a touch sensor. The touch screen displays areas (hereinafter referred to as touch operation areas) that receive touch operations, such as items (menus) that are selectable by users and a plurality of keys for receiving character input. When such an electronic device is operated by only a left hand, for example, it may be difficult for a finger to reach the touch operation area displayed in the right area of the touch screen. JP2014-197334A discloses a technology for changing the position of the touch operation area (specifically, an icon) in accordance with the inclination of the electronic device. When the electronic device is operated with a left hand, for example, this technology allows the touch operation area to be displayed on the left area of the touch screen by tilting the electronic device from the standard posture, and thereby facilitating the operation of the electronic device (that is, facilitating touch on the touch operation area).

JP2014-197334A discloses an example in which the posture of the electronic device where the touch screen is parallel to the gravity direction is defined as the standard posture of the electronic device. The user can change the position of the touch operation area to the right side or the left side by tilting the electronic device in the standard posture to the right or left in a plane parallel to the touch screen. However, when operating the electronic device with one hand, in particular when operating the electronic device having a large touch screen with one hand, sometimes the user may put the electronic device on the hand not in the standard posture shown in JP2014-197334A but in nearly a horizontal posture. In this case, it is difficult to employ the technology disclosed in JP2014-197334A.

SUMMARY OF THE INVENTION

A display system proposed in the present disclosure includes a touch screen mounted on an electronic device and including a display device and a touch sensor; a sensor that outputs a signal corresponding to a posture of the electronic device; and a control device that displays a touch operation area on the touch screen, the touch operation area being an area for receiving a touch operation to the touch screen. The control device includes at least one processor that detects inclination of the electronic device to a horizontal plane perpendicular to a gravity direction using output of the sensor mounted on the electronic device and selects a position of the touch operation area in an image to be displayed in the touch screen. In the selection of the position to display the touch operation area, the control device selects the position to display the touch operation area from at least two positions apart from each other based on the inclination of the electronic device to the horizontal plane. (1) All the processing of the control device may be executed by a processor mounted on the electronic device. In this case, the display system corresponds to the electronic device. (2) In another aspect, a part of the processing of the control device may be executed in the processor mounted on the electronic device, and the remaining processing may be executed in the processor of the server communicating with the electronic device. In this case, the display system is composed of the electronic device and the processor of the server. (3) In yet another aspect, all of the processing of the control device may be executed in the processor of the server in communication with the electronic device. In this case, the display system is composed of the electronic device including the touch screen and the sensor, and the processor of the server communicating with the electronic device.

An example of a display control method proposed in the present disclosure is a display control method for a touch screen provided in an electronic device, the method includes detecting inclination of the electronic device to a horizontal plane perpendicular to a gravity direction by using output of a sensor mounted on the electronic device; selecting a position of a touch operation area in an image to be displayed in the touch screen. The touch operation area is an area for receiving a touch operation to the touch screen. In the selection of the position to display the touch operation area, the position to display the touch operation area is selected from at least two positions apart from each other based on the inclination of the electronic device to the horizontal plane. (1) all the steps of the control method may be executed in a processor mounted on the electronic device, or (2) some steps of the control method may be executed in the processor mounted on the electronic device, and the remaining steps may be executed in the processor of the server in communication with the electronic device, or (3) all the steps of the control method may be executed in the processor of the server in communication with the electronic device.

An information storage medium proposed in the present disclosure is a non-transitory information storage medium storing a program that causes a computer mounted on an electronic device including a touch screen to execute following operations: The program causes the computer to detect inclination of the electronic device to a horizontal plane perpendicular to a gravity direction by using output of a sensor mounted on the electronic device, and select a position of a touch operation area in an image to be displayed in the touch screen. The touch operation area is an area for receiving a touch operation to the touch screen. In the selection of the position to display the touch operation area, select the position to display the touch operation area from at least two positions apart from each other based on the inclination of the electronic device to the horizontal plane. The non-transitory information storage medium is, for example, (1) a memory in the electronic device in which the program is stored by a manufacturer of the electronic device (e.g., a portable terminal used as a smartphone, the same applies below), (2) a memory in the electronic device in which the program is downloaded from a server and stored by an operation of a user of the electronic device, and (3) a memory in the server in which a program for remotely controlling a display screen of the electronic device is stored.

According to the display system, the display control method, and the information storage medium proposed in the present disclosure, the touch operation area can be displayed at an appropriate position by an intuitive operation of the user when the electronic device is operated with one hand.

BRIEF DESCRIPTION OF THE DRAWINGS

FIG. 5 is a diagram for explaining movement of the touch operation area;

FIG. 6 is a block diagram showing functions of a control unit;

FIG. 14A is a diagram for explaining a position of the touch operation area when the electronic device is upside down;

FIG. 14B is a diagram for explaining a position of the touch operation area when the electronic device is upside down;

DETAILED DESCRIPTION OF THE INVENTION

An embodiment of the present invention will be described below. In this specification, an electronic device 10 will be described as an example of the embodiment. The electronic device 10 is a portable information terminal (including a tablet computer) and a mobile phone (including a smart phone), for example.

Hardware Configuration

Figure 1:
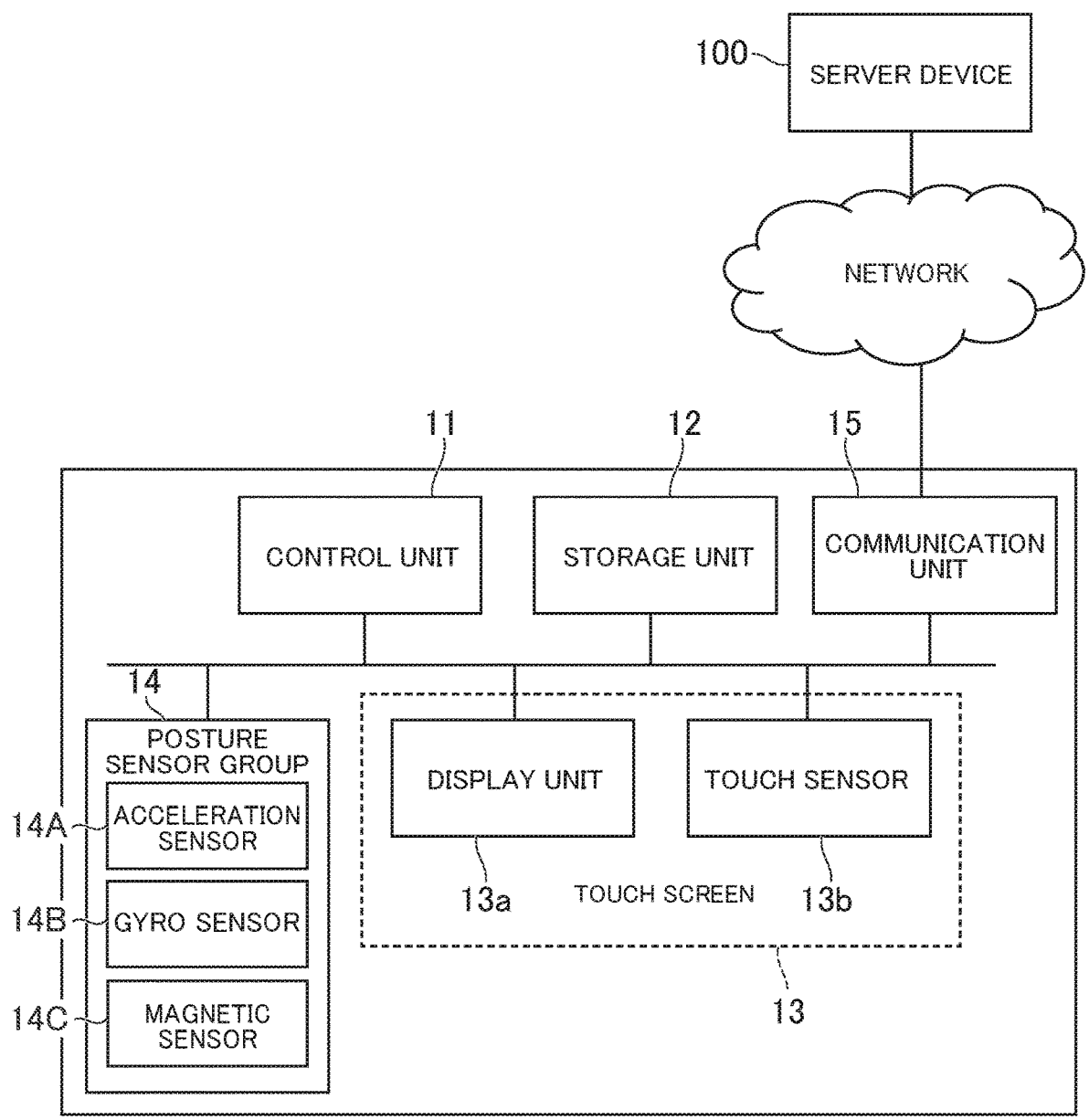
FIG. 1 is a diagram illustrating a hardware configuration of an example of a display system including an electronic device according to an embodiment of the present invention.

FIG. 1 is a diagram illustrating a hardware configuration of the electronic device 10. As shown in FIG. 1, the electronic device 10 includes a control unit 11, a storage unit 12, a touch screen 13, and a posture sensor group 14.

The control unit 11 includes, for example, at least one microprocessor. The control unit 11 executes processing in accordance with programs and data stored in the storage unit 12. The storage unit 12 is a non-transitory informational storage medium including a main storage unit and an auxiliary storage unit. For example, the main storage unit is a volatile memory such as a RAM, and the auxiliary storage unit is a nonvolatile memory such as a hard disk or a flash memory.

The touch screen 13 includes a display unit 13a and a touch sensor 13b. The display unit 13a may be, for example, a liquid crystal display unit and an organic electroluminescence display unit. The touch sensor 13b may be, for example, a resistive film sensor and a capacitive sensor, and may output a signal corresponding to the position of the user's finger touching the touch screen 13.

The posture sensor group 14 includes sensors for outputting a signal corresponding to the posture of the electronic device 10. The posture sensor group 14 includes, for example, a three-axis acceleration sensor 14A. The three-axis acceleration sensor 14A outputs a signal corresponding to the acceleration acting on the electronic device 10 in three orthogonal directions, specifically, the longitudinal, lateral, and normal directions of the touch screen 13 (see FIG. 7A). The signal from the sensor 14A may be fed into the control unit 11 via a low pass filter. The control unit 11 detects the acceleration in three directions based on the signal from the acceleration sensor 14A, and, for example, detects the inclination of the electronic device 10 to the plane (horizontal plane) perpendicular to the gravitational direction from the acceleration.

The posture sensor group 14 may also include a three-axis gyro sensor 14B and a three-axis magnetic sensor 14C in addition to the acceleration sensor 14A. The three-axis gyro sensor 14B outputs a signal corresponding to the angular velocity of the electronic device 10 around the longitudinal axis Ay (see FIG. 7A) of the touch screen 13, the angular velocity of the electronic device 10 around the lateral axis Ax (see FIG. 7A) of the touch screen 13, and the angular velocity of the electronic device 10 around the axis along the normal direction (see FIG. 7A) of the touch screen 13. The control unit 11 time-integrates these angular velocities, thereby detecting the inclination (inclination to the horizontal plane) of the electronic device 10. The three-axis magnetic sensor 14C outputs a signal corresponding to the geomagnetism. The control unit 11 can detect, for example, the orientation of the electronic device 10 in a plane perpendicular to the gravity direction based on the output of the three-axis magnetic sensor 14C.

The electronic device 10 includes communication interfaces for wired or wireless communication, such as, the communication unit 15 that performs data communication via networks. The programs executed by the control unit 11 and the data used by the control unit 11 may be supplied from the server device 100 (e.g., a web server device) to the electronic device 10 via networks.

Posture of Electronic Device and Touch Operation Area

The area for receiving a touch operation (selection operation) of the user is displayed on the touch screen 13. In this specification, this area is referred to as a "touch operation area." The touch operation area displays, for example, one or a plurality of selection candidates that can be selected by the user. The selection candidates are menu items that can be selected by the user and a plurality of keys that receive input of character. The selection candidate may be a button displayed on the touch screen 13 (e.g., a button indicating "close" of a page displayed on the touch screen 13) or an image (icon) associated with a specific function (program).

Figure 2A:
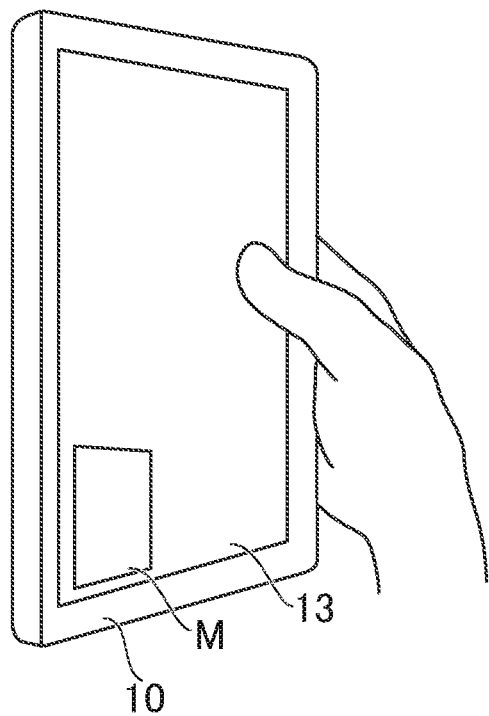
FIG. 2A is a diagram illustrating how the electronic device is operated with a right hand.
Figure 2B:
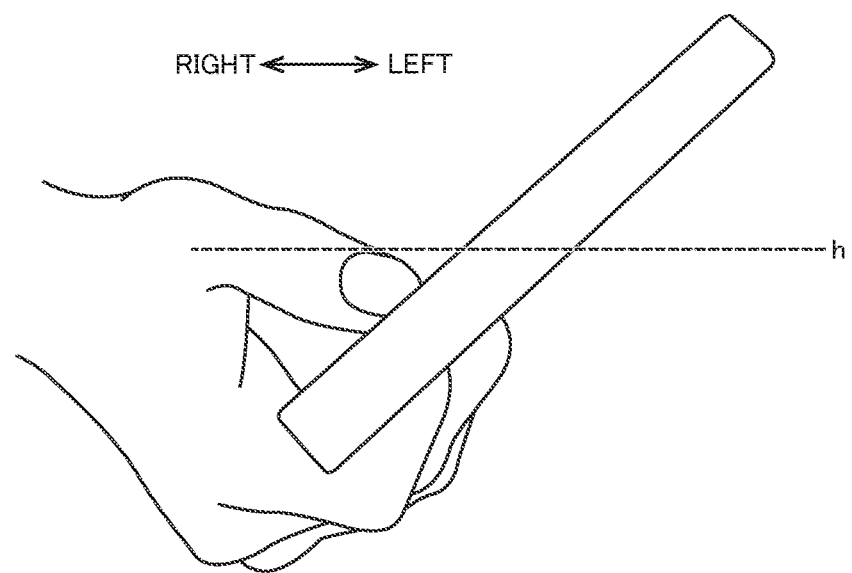
FIG. 2B is a diagram illustrating a posture of the electronic device operated by a right hand.
Figure 3:
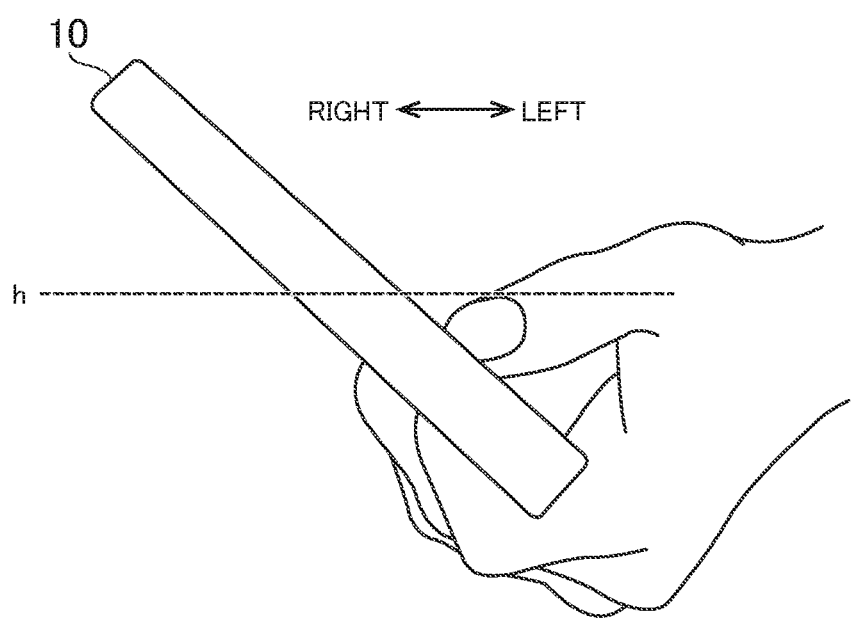
FIG. 3 is a diagram illustrating a posture of the electronic device operated by a left hand.

FIG. 2A is a diagram illustrating how the electronic device 10 is operated with a right hand. FIG. 2B is a diagram illustrating the posture of the electronic device 10 operated by a right hand. FIG. 3 is a diagram illustrating the posture of the electronic device 10 operated by a left hand. FIGS. 4A to 4D are diagrams illustrating positions where the touch operation area M is displayed. FIG. 5 is a diagram for explaining the movement of the touch operation area M.

When the user operates the electronic device 10 with one hand, the user is required to extend the thumb to the touch operation area M. In this regard, in a case where the electronic device 10 is operated with the right hand as shown in FIG. 2A, the user may have difficulty to extend the thumb to the touch operation area M displayed in the left area of the touch screen 13 depending on the size of the hand or the size of the electronic device. In contrast, in a case where the electronic device 10 is operated with the left hand, the user may have difficulty to extend the thumb to the touch operation area M displayed in the right area of the touch screen 13.

Further, when the user operates the electronic device 10 with one hand, sometimes the user supports the rear surface of the electronic device 10 with a finger instead of holding the right side and the left side of the electronic device 10 with the hand. In this case, the electronic device 10 is often supported in a posture inclined to the horizontal plane h. For example, when the electronic device 10 is operated with the right hand, as shown in FIG. 2B, the electronic device 10 is often supported in a posture in which the right side is lowered with respect to the horizontal plane h. In contrast, when the electronic device is operated with the left hand, as shown in FIG. 3, the user often supports the electronic device 10 in a posture in which the left side is lowered.

Figure 4A:
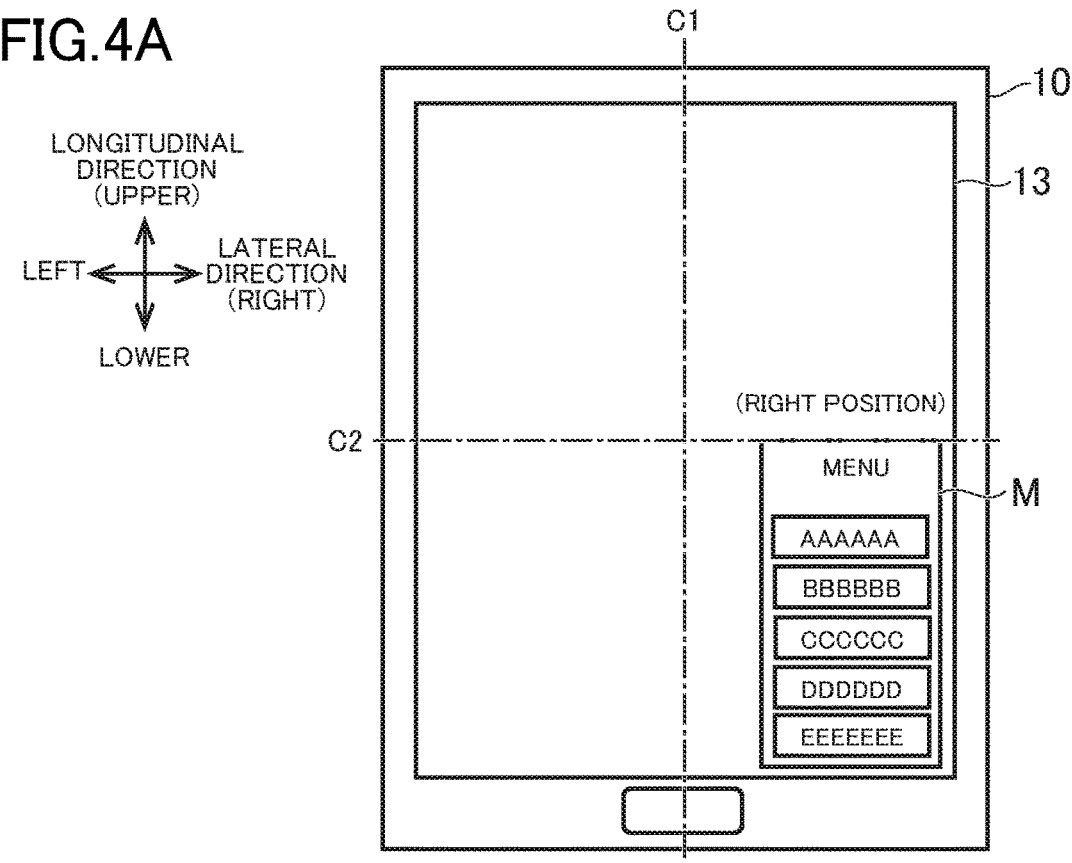
FIG. 4A is a diagram for explaining a position to display a touch operation area.
Figure 4B:
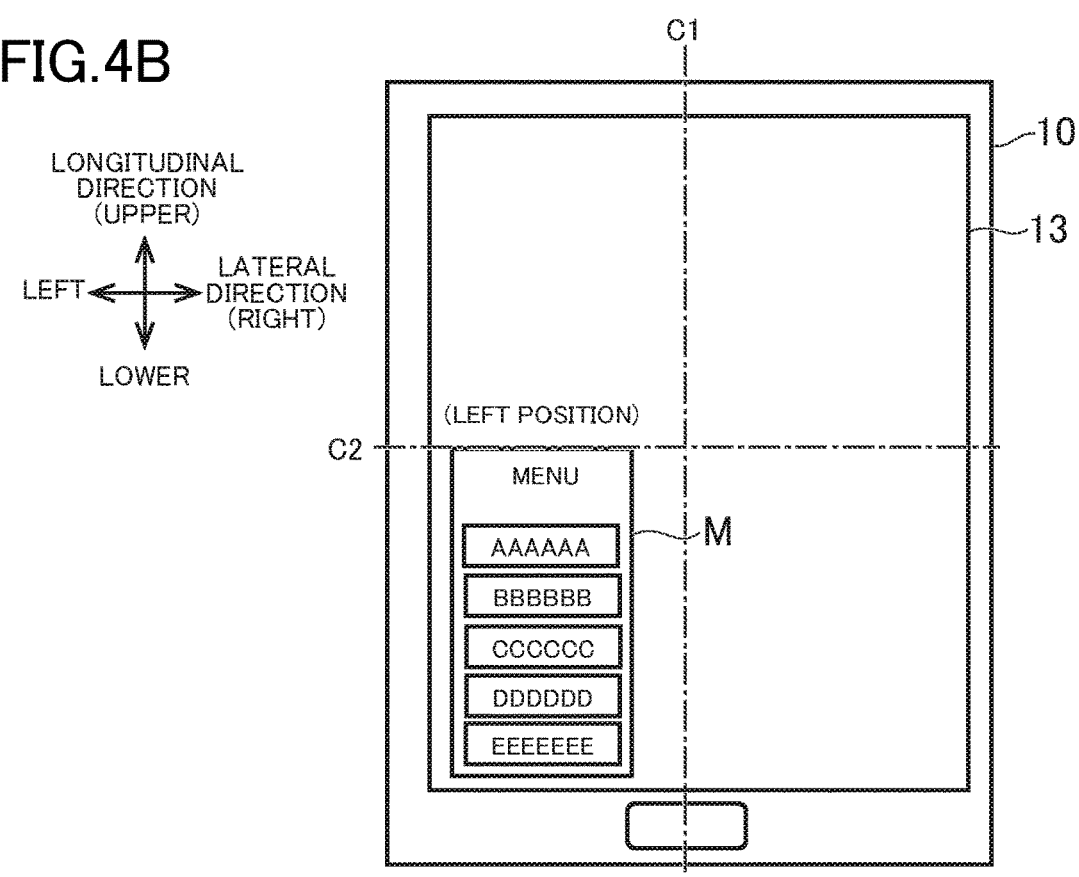
FIG. 4B is a diagram for explaining a position to display the touch operation area.

As such, in the electronic device 10, when the user is assumed to operate the electronic device with the right hand, more specifically, when the electronic device 10 is in a posture with the right side being lowered with respect to the horizontal plane h, the touch operation area M is displayed at the right position defined in the touch screen 13 as shown in FIG. 4A. In contrast, when the user is assumed to operate the electronic device with the left hand, more specifically, when the electronic device 10 is in a posture with the left side being lowered with respect to the horizontal plane h, the touch operation area M is displayed at the left position defined in the touch screen 13 as shown in FIG. 4B.

In the electronic device 10, the touch operation area M may be allowed to move. For example, the touch operation area M ((1) in FIG. 5) at the right position may be moved toward the left position as shown in (2) in FIG. 5. Further, in the electronic device 10, the touch operation area M (FIG. 5 (1)) disposed in the right position may be moved to a position between the right position and the left position as shown in (3) in FIG. 5. That is, in the electronic device 10, the touch operation area M may be moved toward any desired position for the user in the lateral direction of the touch screen 13. This allows the touch operation area to be displayed at a position suitable for each user regardless of a size of a hand or a size of the touch screen 13. Unlike the example shown in FIG. 5, the touch operation area M may be moved further to the right from the right position or further to the left from the left position, depending on the size or the initial position of the touch operation area M.

A plurality of touch operation areas may be simultaneously displayed on the touch screen 13. In this case, all the touch operation areas may be displayed at the right position or the left position according to the posture of the electronic device 10. Further, all the touch operation areas may be movable in the lateral direction of the touch screen 13. As a different example, only a portion of the touch operation areas defined in advance (e.g., frequently used area) may be displayed at the right position (or left position) in accordance with the posture of the electronic device 10. Further, only a portion of the touch operation areas defined in advance (e.g., frequently used area) may be movable in the lateral direction of the electronic device 10.

Processing Executed in Control Unit

As shown in FIG. 6, the control unit 11 includes, as its functions, a posture detecting unit 11A, an operation detecting unit 11B, a display control unit 11C, a position selecting unit 11D, and a position updating unit 11E. The display control unit 11C displays the touch operation area M at the position selected by the position selecting unit 11D or at the position updated by the position updating unit 11E. The functions of the respective units are implemented when the microprocessor constituting the control unit 11 executes the programs stored in the storage unit 12.

If the electronic device 10 includes a communication unit for performing data communication via the network, some of the functions (processing) described below may be executed in the server device 100 to which the electronic device 10 is connected via the network. In this case, the electronic device 10 and the server device 100 constitute the display system for controlling the display of the touch screen 13. If all of the functions (processing) described below are performed in the electronic device 10, the server device 100 may not be an element of the display system.

Posture Detecting Unit

Figure 7A:
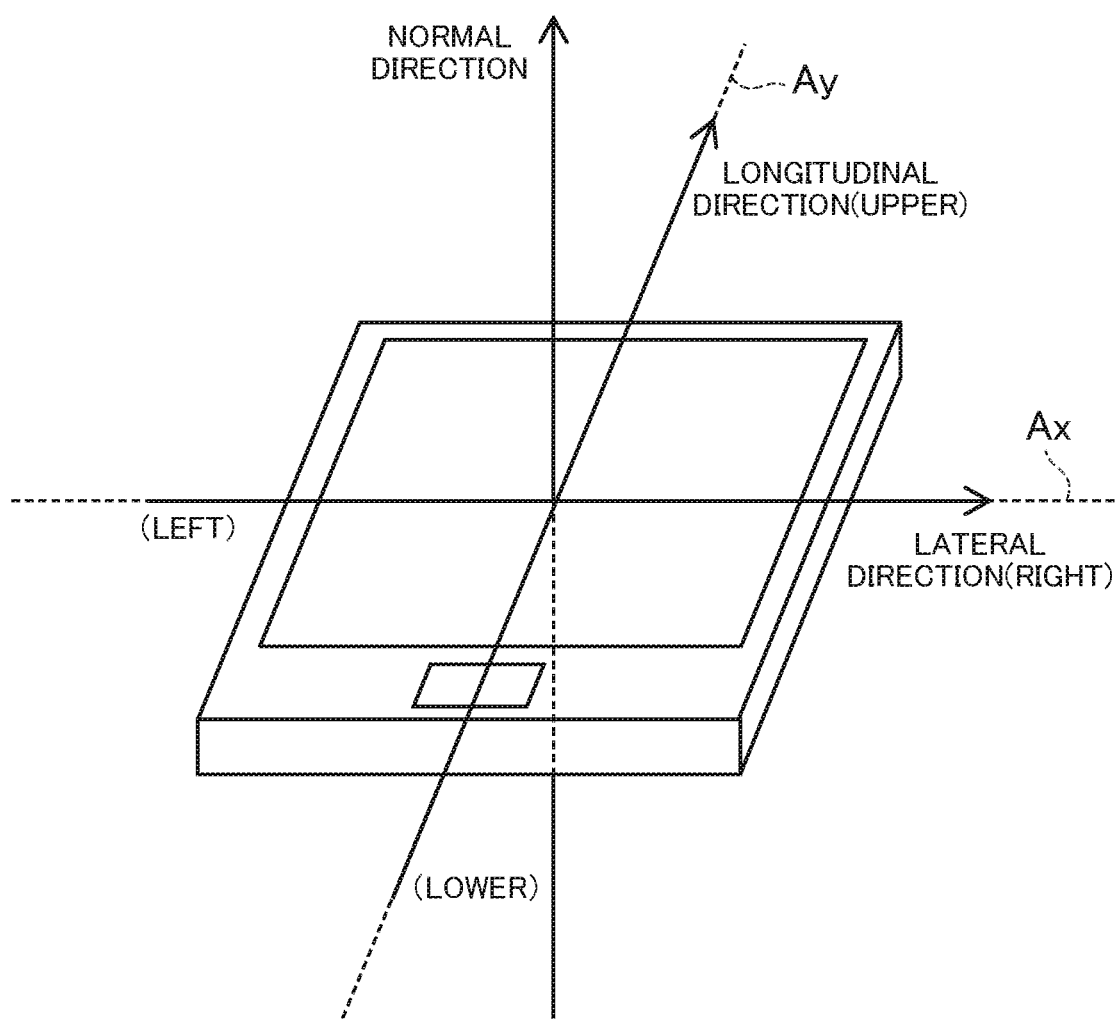
FIG. 7A is a diagram for explaining posture detection of the electronic device by the control unit.
Figure 7B:
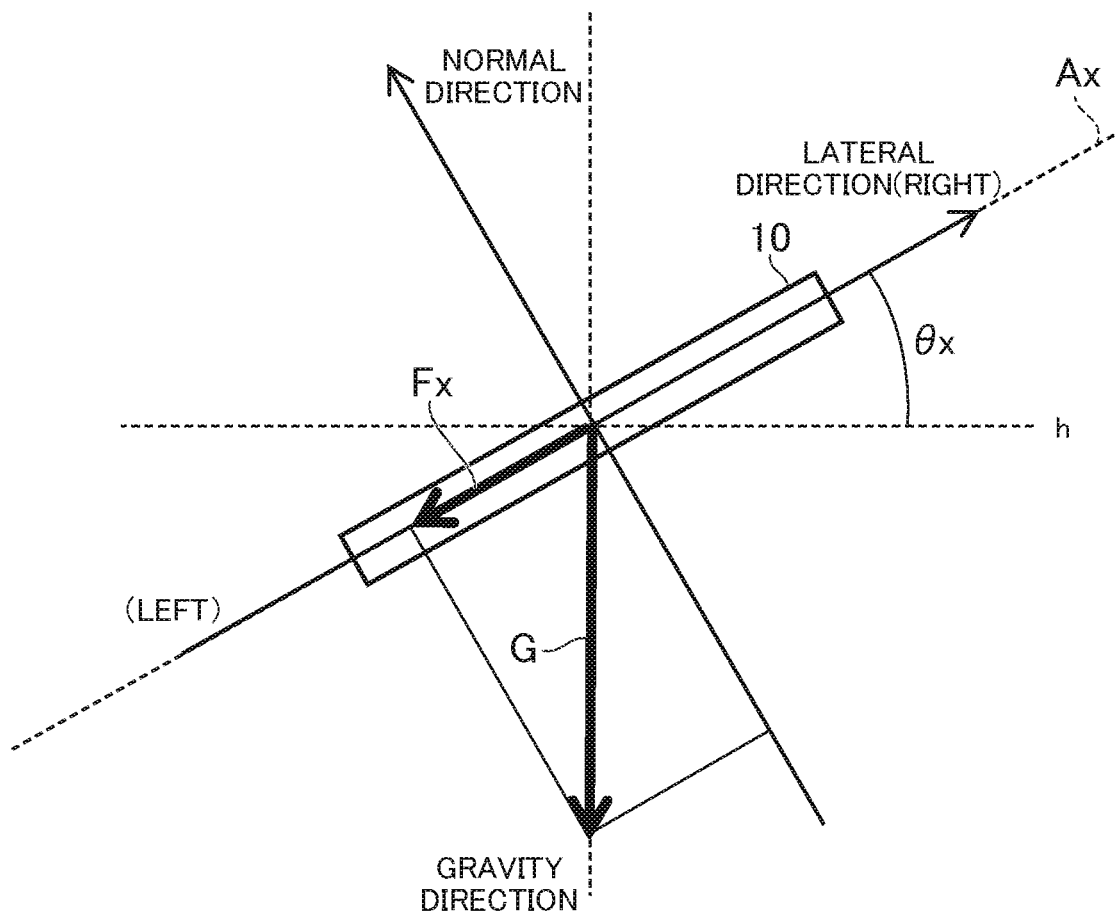
FIG. 7B is a diagram for explaining posture detection of the electronic device by the control unit.

The posture detecting unit 11A detects a posture of the electronic device 10 using the output of the posture sensor group 14. More specifically, the posture detecting unit 11A detects inclination of the electronic device 10 to the horizontal plane perpendicular to the gravity direction. FIGS. 7A and 7B are diagrams for explaining detection of the inclination of the electronic device 10 by the control unit 11. The posture detecting unit 11A detects, for example, the inclination of the lateral axis Ax of the touch screen 13 to the horizontal plane h as the inclination of the electronic device 10 to the horizontal plane h. The lateral axis Ax is an axis along the lateral direction of the touch screen 13.

The posture detecting unit 11A uses, for example, the output of the acceleration sensor 14A. For example, the posture detecting unit 11A obtains lateral acceleration Fx (see FIG. 7B) based on the output of the acceleration sensor 14A, and obtains a value representing the inclination of the lateral axis Ax to the horizontal plane h based on the acceleration Fx. The value representing the inclination of the lateral axis Ax is, for example, an angle θx of the lateral axis Ax to the horizontal plane h (see FIG. 7B). As a different example, an angle of the lateral axis Ax of the touch screen 13 to the gravity direction or the lateral acceleration Fx itself may be used as the value representing the inclination of the lateral axis Ax to the horizontal plane h. The sensor used by the posture detecting unit 11A is not limited to the acceleration sensor 14A, and a gyro sensor 14B may be used, for example.

The electronic device 10 may be used in a lateral posture (posture shown in FIGS. 13A and 13B) rotated by 90 degrees from the longitudinal posture instead of the posture shown in FIGS. 4A and 4B (longitudinal posture). In this case, the position of the touch operation area M is selected from the two positions (upper position and lower position) that are separated in the longitudinal direction of the touch screen 13. In this case, the posture detecting unit 11A obtains longitudinal acceleration based on the output of the acceleration sensor 14A, and obtains a value representing the inclination of the longitudinal axis Ay to the horizontal plane h based on the acceleration. The value representing the inclination of the longitudinal axis Ay is, for example, an angle of the longitudinal axis Ay to the horizontal plane h. As a different example, an angle of the longitudinal axis Ay of the touch screen 13 to the gravity direction and the longitudinal acceleration itself can be used as a value representing the inclination of the longitudinal axis Ay to the horizontal plane h.

Position Selecting Unit

The position selecting unit 11D selects, from at least two positions away from each other, a position to display the touch operation area M based on the inclination of the electronic device 10 to the horizontal plane h. The selected position is a position in whole image displayed on the touch screen 13. For example, the position selecting unit 11D selects a position to display the touch operation area M based on the inclination of the electronic device 10 from the right position and the left position away from each other in the lateral direction. Specifically, the position selecting unit 11D selects a position to display the touch operation area M based on the inclination of the lateral axis Ax of the touch screen 13 to the horizontal plane h. If the right position is lower than the left position due to the inclination of the electronic device 10, the position selecting unit 11D selects the right position. In contrast, if the left position is lower than the right position due to the inclination of the electronic device 10, the position selecting unit 11D selects the left position.

As a value representing the inclination of the lateral axis Ax to the horizontal plane h, the position selecting unit 11D uses, for example, the angle θx (angle of the lateral axis Ax of the touch screen 13 to the horizontal plane h, see FIG. 7B) calculated by the posture detecting unit 11A. If the angle θx of the lateral axis Ax (see FIG. 7B) is positive or larger than a positive threshold, the position selecting unit 11D selects one of the right position and the left position (e.g., left position). In contrast, if the angle θx of the lateral axis Ax is negative or smaller than a negative threshold, the position selecting unit 11D selects the other of the right position and the left position (e.g., right position). The position selecting unit 11D may use the lateral acceleration Fx itself instead of the angle θx as a value representing the inclination of the lateral axis Ax, or may use an angle between the lateral axis Ax of the touch screen 13 and the gravity direction.

As shown in FIGS. 4A and 4B, for example, the right position is a position defined on the right side of the center line C1 passing through the center of the touch screen 13 in the lateral direction and along the longitudinal direction, and the left position is a position defined on the left side of the center line C1. The touch operation area M may partially overlap the center line C1. Unlike the examples of FIGS. 4A and 4B, both the right position and the left position may be defined on the right side (or left side) of the centerline C1. In this case, the position of the touch operation area M is selected in an area on the right side (or left side) of the center line C1. In this case as well, the operability with the thumb can be improved compared to the case where the position of the touch operation area M is fixed.

In a case where the display control unit 11C selectively displays a plurality of touch operation areas, a right position and a left position may be previously defined for each of the plurality of touch operation areas. In this case, a right position (or left position) defined for a first touch operation area may be different from a right position (or left position) defined for a second touch operation area. This allows the touch operation areas to be displayed at positions suitable for the size and frequency of use of the touch operation areas, for example.

The position selecting unit 11D selects a position to display the touch operation area M based on the inclination of the lateral axis Ax detected in response to a predetermined touch operation performed on the touch screen 13.

An example of the touch operation is a touch operation for instructing the operating system of the control unit 11 (the computer) to activate a program for implementing the posture detecting unit 11A and the position selecting unit 11D described above (hereinafter referred to as application software). For example, when an icon associated with the application software is displayed on the touch screen 13, the touch operation to the icon corresponds to the predetermined touch operation described above. In this case, in response to the activation of the application software, the posture detecting unit 11A detects the inclination of the electronic device 10 (the inclination of the lateral axis Ax to the horizontal plane h), and then the position selecting unit 11D selects the position to display the touch operation area M based on the detected inclination. According to such a position selecting unit 11D, the touch operation area M is displayed at a position corresponding to the inclination of the electronic device 10 on the screen immediately after the application software is activated (e.g., on the initial screen of the application software). This allows the touch operation area M to be displayed at a desirable position for the user from the start of use of the application software, and the operability of the application software can be improved accordingly.

The display control unit 11C may selectively display a first image (page) and a second image (page) including the touch operation area M. For example, the display control unit 11C may display the second image after completing the display of the first image. The first image is, for example, an initial image (initial page) of the application software, and the second image is, for example, an image (page) displayed following the initial image. The predetermined touch operation that triggers the processing of selecting a position of the touch operation area M may be a touch operation that instructs switching from the first image to the second image. That is, in response to the touch operation for switching from the first image to the second image, the posture detecting unit 11A may detect the inclination of the electronic device 10 (the inclination of the lateral axis Ax to the horizontal plane h), and the position selecting unit 11D may select a position to display the touch operation area M based on the detected inclination. The display control unit 11C may then display the touch operation area M at the position selected in the second image. According to this processing, the position of the touch operation area M is selected based on the posture (inclination) of the electronic device 10 immediately before the touch operation area M is displayed.

In a case where the electronic device 10 is connected to the server device 100 via a network, the posture detecting unit 11A and the display control unit 11C may be installed on the control unit 11, and the position selecting unit 11D may be installed on the control unit of the server device 100. In this case, the inclination of the electronic device 10 calculated by the posture detecting unit 11A may be transmitted to the server device 100, and the position selecting unit 11D may select a position to display the touch operation area M based on the received inclination of the electronic device 10. Subsequently, the server device 100 may transmit information of the selected position to the electronic device 10, and the display control unit 11C may display the touch operation area M at the selected position.

As still other examples, in a case where the electronic device 10 is connected to the server device 100 via a network, the display control unit 11C may be installed into the control unit 11, and the posture detecting unit 11A and the position selecting unit 11D may be installed into the control unit of the server device 100. In this case, the control unit 11 of the electronic device 10 may transmit the output of the posture sensor group 14 to the server device 100, the posture detecting unit 11A may calculate the inclination of the electronic device 10 based on the output received from the posture sensor group 14, and the position selecting unit 11D may select the position to display the touch operation area M based on the calculated inclination of the electronic device 10. The server device 100 may then transmit information of the selected position to the electronic device 10, and the display control unit 11C may display the touch operation area M at the selected position.

In a case where the electronic device 10 is connected to the server device 100 via a network, the control unit 11 may request data of the first image (page) and the second image (page) including the touch operation area M from the server device 100. Such processing of the control unit 11 can be implemented by a web browser installed in the control unit 11. In addition to the data of the first image and the second image, the server device 100 may transmit the program of the posture detecting unit 11A, the program of the position selecting unit 11D, and the program of display control unit 11C to the electronic device 10. The data of the first image and the second image is, for example, data described by HTML (HyperText Markup Language). The program of the posture detecting unit 11A, the program of the position selecting unit 11D, and the program of the display control unit 11C are described in, for example, JavaScript (registered trademark). The control unit 11 executes the received programs, and functions as the posture detecting unit 11A, the position selecting unit 11D, and the display control unit 11C. That is, the control unit 11 may calculate the inclination of the electronic device 10 based on the output of the posture sensor group 14, and the position selecting unit 11D may select a position to display the touch operation area M based on the calculated inclination of the electronic device 10. The display control unit 11C may then display the touch operation area M at the position selected in the second image (page).

As yet another example, when the control unit 11 requests the server device 100 for the data of the first image and the second image including the touch operation area M, the server device 100 may transmit, for example, the program of the posture detecting unit 11A and the program of the display control unit 11C described by JavaScript to the electronic device 10 in addition to the data of the first image and the second image described by HTML (HyperText Markup Language). On the other hand, the position selecting unit 11D may be installed into the control unit of the server device 100. In this case, the inclination of the electronic device 10 calculated by the posture detecting unit 11A is transmitted to the server device 100, and the position selecting unit 11D selects a position to display the touch operation area M based on the received inclination of the electronic device 10. Subsequently, the server device 100 may transmit information of the selected position to the electronic device 10, and the display control unit 11C may display the second image having the touch operation area M at the selected position.

As yet another example, when the control unit 11 requests the server device 100 for the data of the first image and the second image including the touch operation area M, the server device 100 may transmit, for example, the program of the display control unit 11C described by JavaScript to the electronic device 10 in addition to the data of the first image and the second image described by HTML (Hyper Text Markup Language). The posture detecting unit 11A and the position selecting unit 11D may be installed into the control unit of the server device 100. In this case, the control unit 11 of the electronic device 10 may transmit the output of the posture sensor group 14 to the server device 100, the posture detecting unit 11A may calculate the inclination of the electronic device 10 based on the output received from the posture sensor group 14, and the position selecting unit 11D may select the position to display the touch operation area M based on the calculated inclination of the electronic device 10. Subsequently, the server device 100 may transmit information of the selected position to the electronic device 10, and the display control unit 11C may display the second image having the touch operation area M at the selected position.

Operation Detecting Unit

The operation detecting unit 11B detects an operation that triggers the movement of the touch operation area M, in other words, an operation that triggers releasing the fixing of the position of the touch operation area M. In the electronic device 10, the operation detected by the operation detecting unit 11B is a shake operation. The shake operation is, for example, an operation of swinging the electronic device 10 in a predetermined direction. The predetermined direction is, for example, the lateral direction of the touch screen 13. In this case, the operation detecting unit 11B detects acceleration acting in the lateral direction of the touch screen 13 by the output of the acceleration sensor 14A, and detects the shake operation based on the acceleration.

Figure 8:
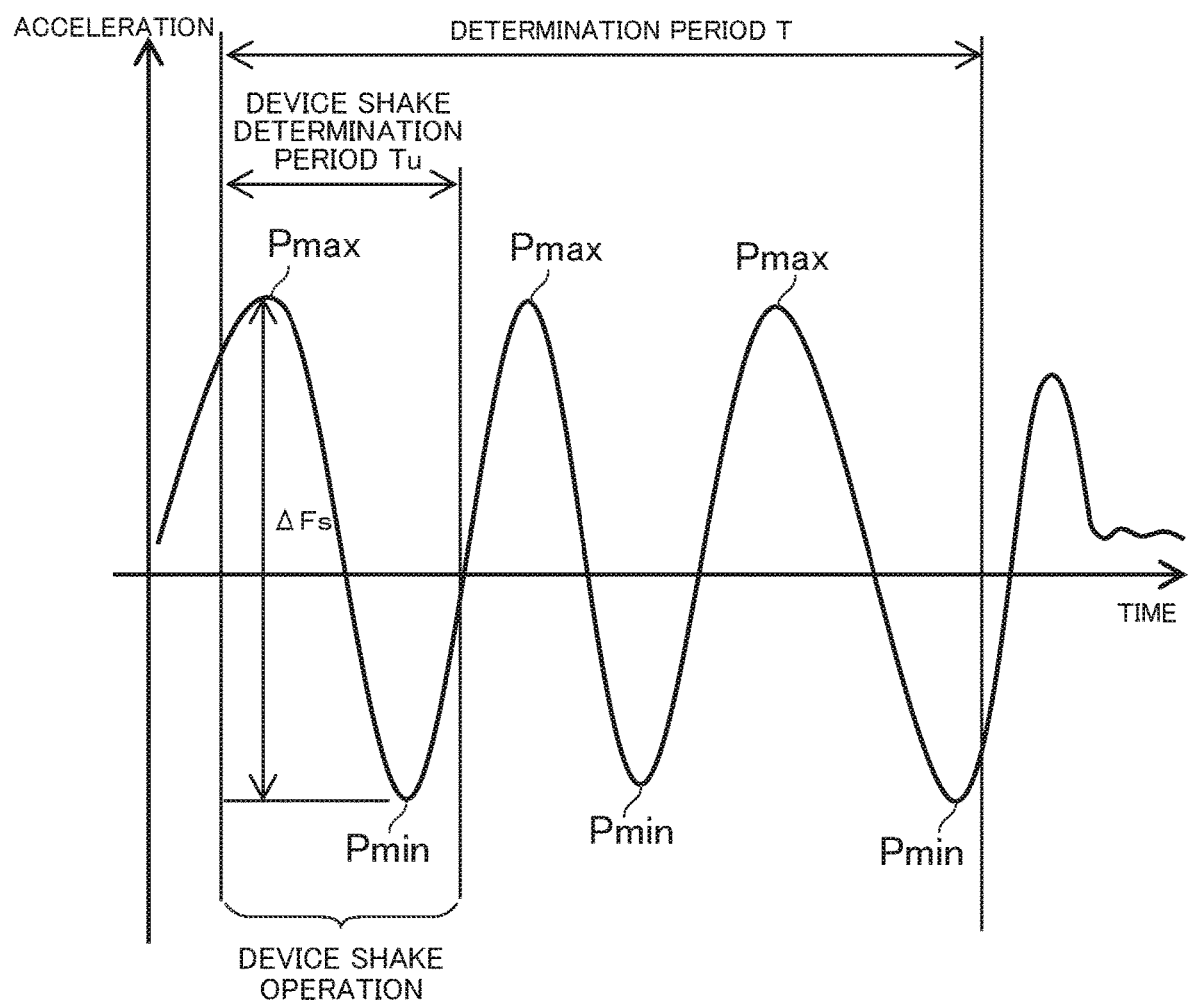
FIG. 8 is a diagram for explaining an example of processing for detecting a shake operation.

FIG. 8 is a diagram for explaining an example of processing for detecting the shake operation. As shown in FIG. 8, when the user performs a shake operation, the acceleration acting on the electronic device 10 repeats ascending and descending. The operation detecting unit 11B detects a device shake operation based on the change in time base of the acceleration detected by the acceleration sensor 14A. When the number of device shake operations reaches a threshold value of 2 or more within a predetermined period (determination period T), the operation detecting unit 11B determines that the shake operation has been performed.

The device shake operation is, for example, a shake that occurs within the predetermined period (referred as to device shake determination period Tu) and is larger than a threshold value (device shake determination period Tu<determination period T). The operation detecting unit 11B detects, for example, minimum Pmin and/or maximum Pmax in the device shake determination period Tu based on the change in time base of the acceleration, and determines the shake of the electronic device 10 by using the minimum Pmin and/or the maximum Pmax. For example, when a difference AFs between the minimum Pmin and the maximum Pmax is larger than the threshold value, the operation detecting unit 11B determines the shake as the device shake operation. As another example, when the minimum Pmin is smaller than the negative threshold value and the maximum Pmax is larger than the positive threshold value, the operation detecting unit 11B may determine that the device shake operation has occurred.

The acceleration used by the operation detecting unit 11B may not necessarily be the acceleration acting in the lateral direction of the touch screen 13. For example, the operation detecting unit 11B may detect the acceleration acting in the longitudinal direction of the touch screen 13 and detect the device shake operation based on the detected acceleration. In this case as well, the operation detecting unit 11B may detect the device shake operation based on the change in time base of the longitudinal acceleration, and when the number of the device shake operations reaches the threshold value of 2 or more within the device shake determination period T, the operation detecting unit 11B may determine that the device shake operation has been performed.

Position Updating Unit

As shown in FIG. 5, when the shake operation is detected, the position updating unit 11E moves the position of the touch operation area M displayed on the touch screen 13 in a direction according to the posture of the electronic device 10. This allows the user to move the position of the touch operation area M in a desired direction with a simple one-hand operation.

The posture of the electronic device 10 is, for example, the inclination of the electronic device 10 detected by the posture detecting unit 11A, that is, the inclination of the lateral axis Ax of the touch screen 13 to the horizontal plane h. As such, the position updating unit 11E moves the touch operation area M in a direction according to the inclination of the lateral axis Ax to the horizontal plane h. When the user lowers the right side of the electronic device 10, the position updating unit 11E moves the touch operation area M to the right, and when the user lowers the left side of the electronic device 10, the position updating unit 11E moves the touch operation area M to the left.

The position updating unit 11E repeats the processing of updating the position to display the touch operation area M at a predetermined cycle (e.g., a cycle of updating the display of the touch screen 13). The position updating unit 11E calculates the next position of the touch operation area M based on the current position of the touch operation area M and the velocity of the touch operation area M. In the following, single processing of calculating the next position from the current position is referred to as "position updating processing." By repeating the position updating processing, the touch operation area M displayed on the touch screen 13 gradually moves rightward or leftward.

The position updating unit 11E may calculate the velocity of the touch operation area M based on the inclination of the electronic device 10 to the horizontal plane h (specifically, the inclination of the lateral axis Ax to the horizontal plane h). For example, as the inclination of the electronic device 10 increases, the velocity of the touch operation area M may increase. This allows the touch operation area M to move like an object rolling on a downhill slope, thereby improving the intuitive operability of the application software. The velocity of the touch operation area M may be calculated based on the inclination of the electronic device 10 that is detected in each of the repeatedly executed position updating processing. In this way, when the inclination of the electronic device 10 is changed during the movement of the touch operation area M, the velocity of the touch operation area M is also changed accordingly.

The position updating unit 11E may calculate the velocity of the touch operation area M based on the pseudo friction defined in the touch screen 13. Here, "friction" is, for example, acceleration acting in a direction of decreasing the velocity of the touch operation area M, and functions as a resistance to the movement of the touch operation area M. The position updating unit 11E may calculate the velocity of the touch operation area M based on the friction defined in the touch screen 13 and the inclination of the electronic device 10 (specifically, the inclination of the lateral axis Ax to the horizontal plane h). By reducing the inclination of the electronic device 10, for example, the user can relatively increase the resistance to the movement of the touch operation area and reduce the velocity of the touch operation area M. This enables the user to stop the touch operation area M at a desired position.

A pseudo friction coefficient for obtaining friction may be defined in the touch screen 13. The friction, friction coefficient, and acceleration of the touch operation area is expressed by, for example, the following equation:

Friction=$G \times \cos(\theta x) \times \mu$

Acceleration=$G \times \sin(\theta x) - G \times \cos(\theta x) \times \mu$

In the equation, "G" is the gravitational acceleration, "$\theta x$" is the angle of the lateral axis Ax to the horizontal plane h, and "$\mu$" is the friction coefficient. The position updating unit 11E is able to calculate the velocity of the touch operation area M using the acceleration.

The friction or friction coefficient may be determined according to the position (coordinates) on the touch screen 13. For example, the position updating unit 11E may refer to a map that associates the friction or the friction coefficient with the position (coordinates) on the touch screen 13 and obtain the friction or the friction coefficient corresponding to the current position of the touch operation area M. The position updating unit 11E may calculate the velocity of the touch operation area M based on the obtained friction or friction coefficient and the inclination of the electronic device 10. Such a map is stored in the storage unit 12. According to such processing, the velocity of the touch operation area M depends on the position (coordinates) at which the touch operation area M is displayed. As a result, for example, the friction or the friction coefficient is increased at a position suitable for the position of the touch operation area M, and the velocity of the touch operation area M can be thereby lowered and the touch operation area M easily stops at that position. For example, when the touch operation area M moves leftward from the right position, the velocity of the touch operation area M can be decreased as the touch operation area M approaches the left position.

Figure 9:
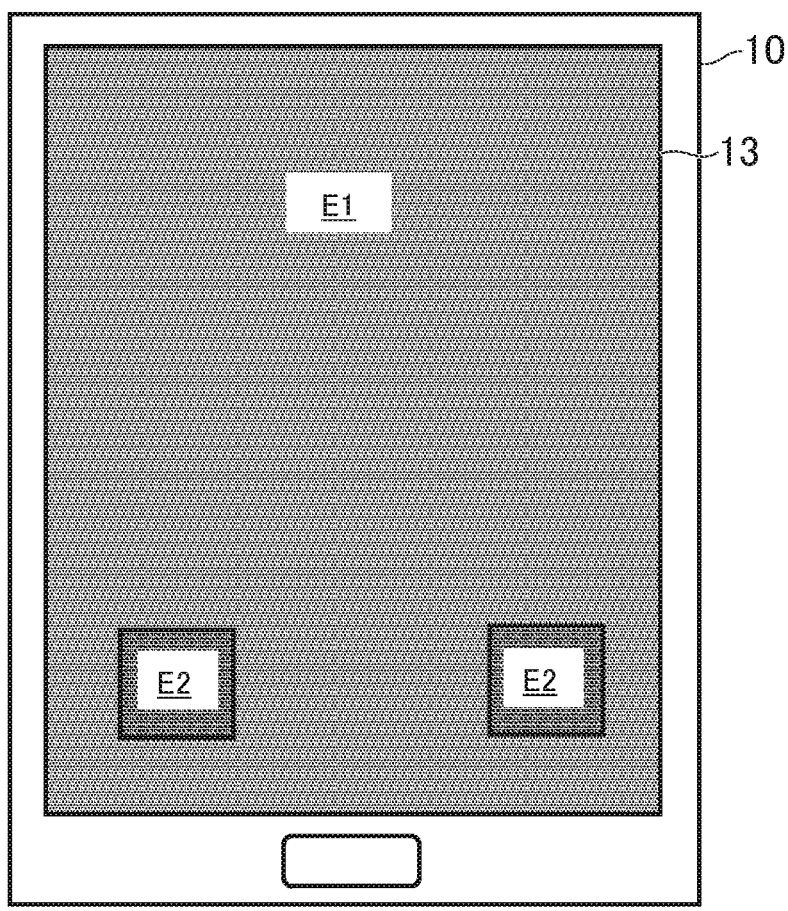
FIG. 9 is a diagram illustrating an example of a map associating a position on the touch screen with a friction coefficient.

FIG. 9 is a diagram illustrating an example of the map. In areas E2 corresponding to the right position and the left position, a relatively high friction coefficient is defined, and a relatively low friction coefficient is defined in the other area E1. According to such a friction coefficient, as the touch operation area M approaches the right position or the left position, the velocity of the touch operation area M becomes lower. The friction coefficient is also set in the area E1. Thus the user adjusts the inclination of the electronic device 10 during the movement of the touch operation area M, to thereby stop the touch operation area M at a position between the right position and the left position. The friction coefficient defined in the area E1 may be 0.

The processing of the position updating unit 11E is not limited to the examples described here. For example, unlike the example shown in FIG. 9, the friction coefficient defined in the touch screen 13 may vary continuously according to position (coordinates) on the touch screen 13.

In still other examples, the coefficient of friction may be uniform over the touch screen 13. In this case, the position updating unit 11E may calculate the velocity of the touch operation area M based on the constant friction coefficient and the inclination of the electronic device 10 without referring to the map shown in FIG. 9.

In a case where the display control unit 11C displays a plurality of touch operation areas and a plurality of images (pages), a friction coefficient (or a map defining a friction coefficient) may be provided for each of the touch operation areas and/or the images.

In still another example, the velocity of the touch operation area M may be constant regardless of the position on the touch screen 13. In this case, the position updating unit 11E may stop the movement of the touch operation area M when the touch operation area M reaches the right position or the left position. This can simplify the processing executed by the position updating unit 11E.

Termination of Position Updating Processing

When a predetermined stop condition is satisfied, the position updating unit 11E terminates the position updating processing and stops the touch operation area M. An example of the stop condition is that the velocity of the touch operation area M becomes lower than a threshold value. Another example of the stop condition is that the touch operation area M reaches the right or left position.

The position updating unit 11E stops the touch operation area M when the stop condition is satisfied, and records the position of the touch operation area M at that time in the storage unit 12. The position selecting unit 11D displays the touch operation area M at the position stored in the storage unit 12 when the touch operation area M is displayed next time or when a new touch operation area is displayed. This reduces the frequency at which the operation of moving the touch operation area is required.

In the normal state (in other words, before the shake operation is detected), the position of the touch operation area M is fixed in place. When the device shake operation is detected, the position of the touch operation area M is released from the fixed position, and the movement of the touch operation area M is allowed. When the stop condition is satisfied, the position of the touch operation area M is fixed at the new position after the movement until the device shake operation is detected again.

Flow Chart of Processing

Figure 10:
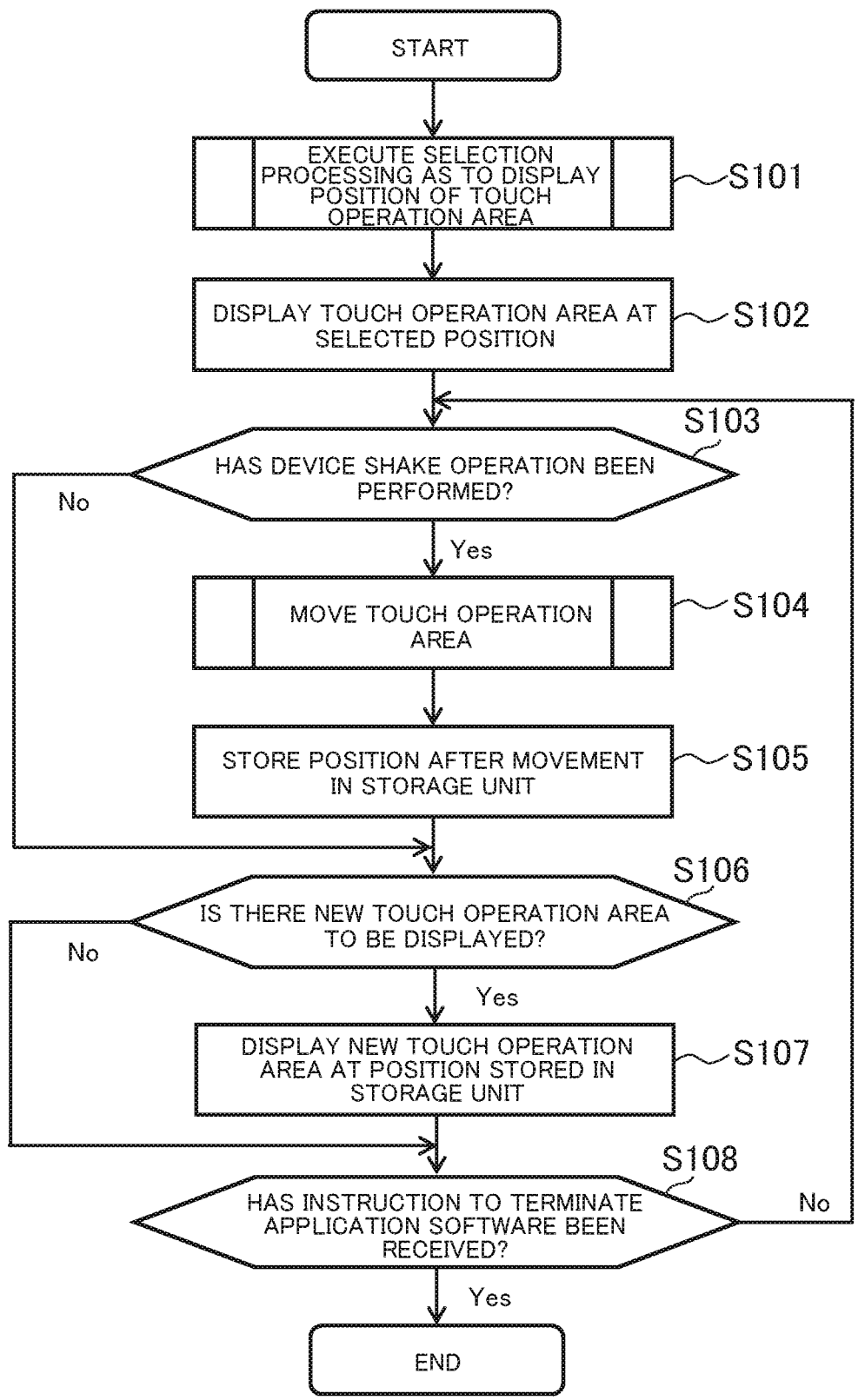
FIG. 10 is a flow chart showing an example of processing executed by the control unit.

FIG. 10 is a flow chart for explaining an example of the processing executed by the control unit 11. This processing begins when the operating system of the control unit 11 is instructed to activate the application software.

When the instruction to activate the application software is issued, the position selecting unit 11D executes selection processing as to a position to display the touch operation area M (S101). With the selection processing, a position corresponding to the inclination of the electronic device 10 (the inclination of the lateral axis Ax of the touch screen 13 to the horizontal plane h) is selected from the right position and the left position of the touch screen 13. Details of the selection processing will be described later with reference to FIG. 11. When the position of the touch operation area M is selected, the display control unit 11C displays the touch operation area M at the selected position in the initial image (page) of the application software (S102).

Next, the operation detecting unit 11B determines whether a device shake operation has been performed (S103). As described above, the operation detecting unit 11B detects a device shake operation based on the change in time base of the acceleration detected by the output of the acceleration sensor 14A, and when the number of the device shake operations reaches the threshold value of 2 or more, it is determined that the shake operation has been performed. When the shake operation is performed, the position updating unit 11E moves the touch operation area M in a direction according to the inclination of the electronic device 10 (S104). The processing relating to the movement of the touch operation area M will be described later in detail with reference to FIG. 13. When the movement of the touch operation area M is completed, the position updating unit 11E stores the position after the movement in the storage unit 12 (S105).

Subsequently, the display control unit 11C determines whether there is a new touch operation area to be displayed (S106). If there is a new touch operation area to be displayed, the display control unit 11C displays the new touch operation area at the position stored in the storage unit 12 (S107).

The control unit 11 determines whether an instruction to terminate the application software has been received (S108). Upon receiving this termination instruction, the control unit 11 terminates the processing of the application software. On the other hand, if the termination instruction has not been received, the control unit 11 returns to S103 and executes the subsequent processing again.

If the device shake operation is not performed in S103, the processing of S106 is executed without executing the processing of S104 and S105 relating to the moving of the touch operation area M. If there is no new touch operation area in S106, whether an instruction to terminate the application is issued is determined without performing the processing of S107 (S108).

Figure 11:
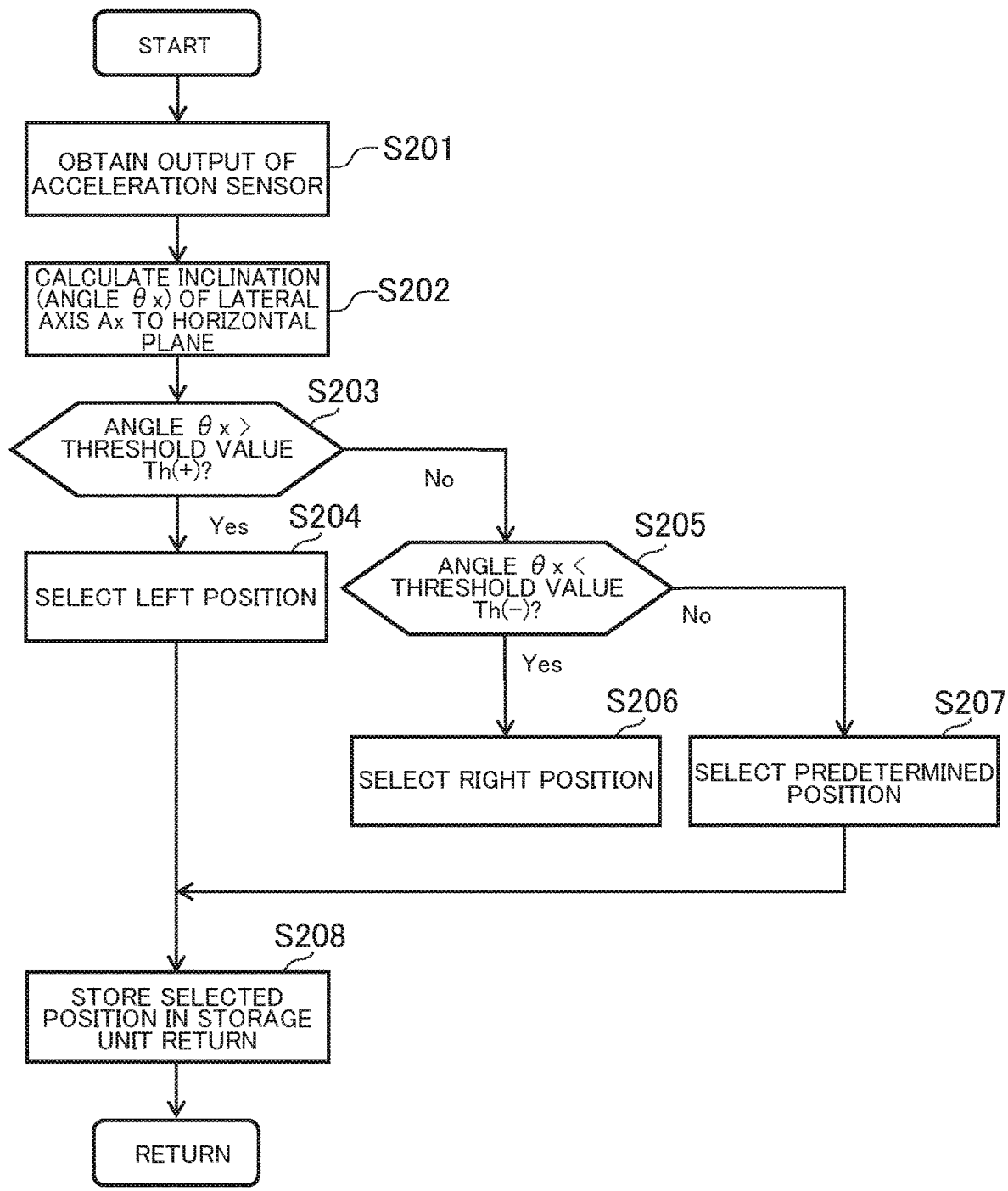
FIG. 11 is a flow chart showing an example of processing of selecting a position of the touch operation area as indicated by S101 in the flow chart of FIG. 10.

FIG. 11 is a flow chart showing an example of the selection processing of a position to display the touch operation area M as indicated by S101 in the flow chart of FIG. 10.

The posture detecting unit 11A obtains the output of the acceleration sensor 14A (S201), and detects the inclination of the lateral axis Ax of the touch screen 13 to the horizontal plane h based on the output of the acceleration sensor 14A (S202). The posture detecting unit 11A calculates, for example, the angle θx between the horizontal plane h and the lateral axis Ax (see FIG. 7B) as a value representing the inclination of the lateral axis Ax based on the lateral acceleration Fx (see FIG. 7B) and the gravitational acceleration.

The position selecting unit 11D compares the value representing the inclination of the lateral axis Ax with the threshold value. For example, the position selecting unit 11D first determines whether the angle θx is greater than the positive threshold value Th(+) (S203). If the angle θx is larger than the threshold value Th(+), the position selecting unit 11D selects one of the right position and the left position (e.g., left position) as a position to display the touch operation area M (S204). On the other hand, if the angle θx is not larger than the threshold value Th(+), the position selecting unit 11D determines whether the angle θx is smaller than the negative threshold value Th(−) (S205). If the angle θx is smaller than the threshold value Th(−), the position selecting unit 11D selects the other one of the right position and the left position (e.g., the right position) as a position to display the touch operation area M (S206). On the other hand, if the angle θx is not smaller than the threshold value Th(−), that is, if the absolute value of the angle θx is smaller than the threshold value Th, the position selecting unit 11D selects a predetermined position as a position to display the touch operation area M (S207).

The predetermined position may be, for example, a right position. Typically, there are more right-handed users, and thus the right position is set as a predetermined position so that the touch operation area M is displayed at a position desired for many users. Another example of the predetermined position may be a position between the right position and the left position. The predetermined position may be a position last stored in the storage unit 12 as a position where the touch operation area is displayed in the previous operation of the application software.

When the position to display the touch operation area is selected in the processing of S204, S206, and S207, the position selecting unit 11D stores the selected position in the storage unit 12 (S208). As a result, the processing of the control unit 11 returns to S102 shown in FIG. 10.

The value representing the inclination of the lateral axis Ax of the touch screen 13 may not necessarily be the angle θx. Such a value may be, for example, the acceleration Fx itself acting in the lateral direction of the touch screen 13. In this case, the position selecting unit 11D may compare the acceleration Fx with the positive threshold value in S203, and compare the acceleration Fx with the negative threshold value in S205. As yet another example, an angle between the lateral axis Ax and the gravity direction may be used as a value representing the inclination of the lateral axis Ax of the touch screen 13. In this case, if the angle between the lateral axis Ax and the gravity direction is smaller than the threshold value (threshold value <π/2), the position selecting unit 11D may select one of the right position and the left position. If the angle between the lateral axis Ax and the gravity direction is greater than the threshold value (threshold value >π/2), the position selecting unit 11D may select the other of the right position and the left position.

Figure 12:
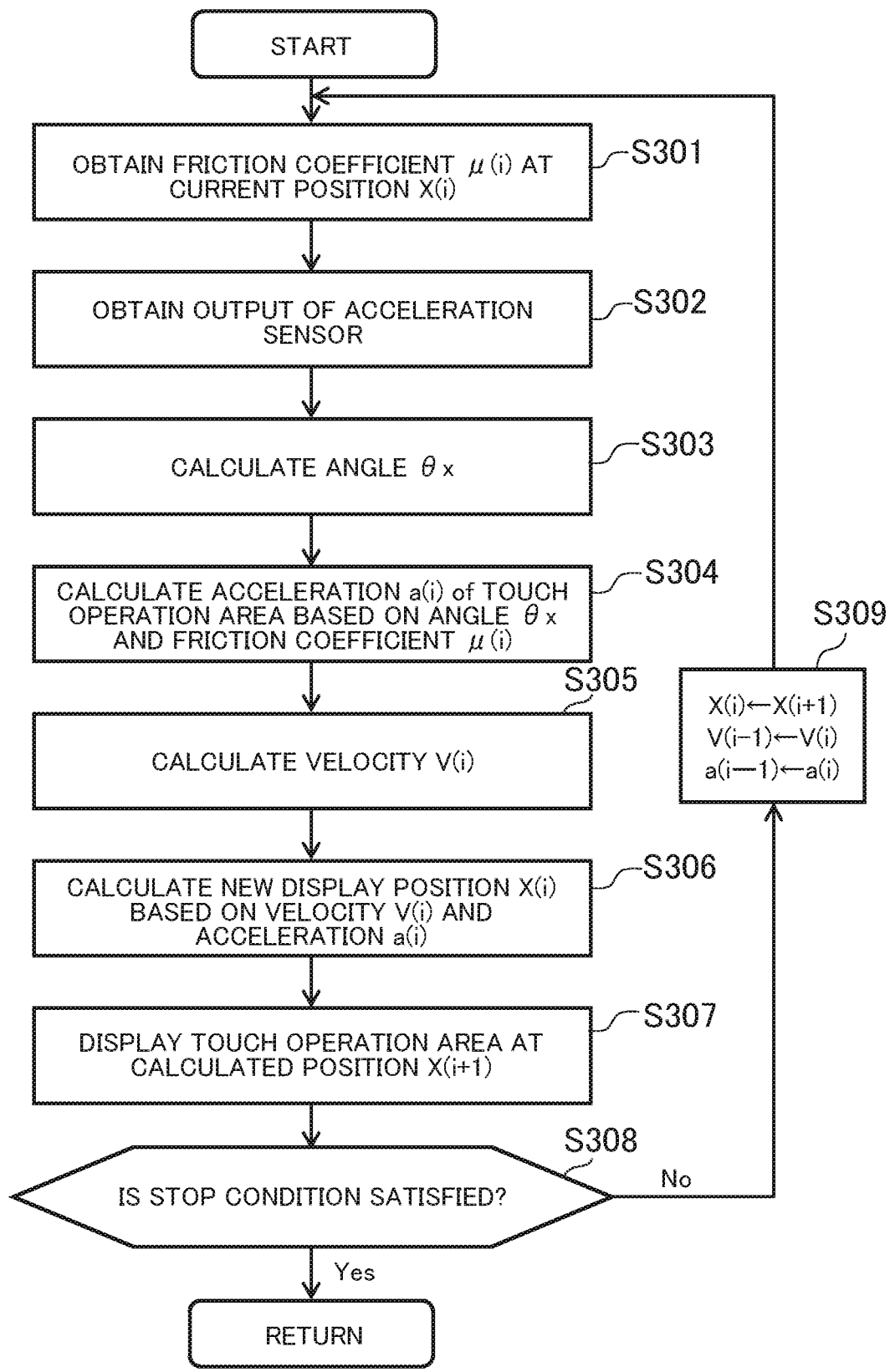
FIG. 12 is a flow chart showing an example of processing of movement of the touch operation area indicated by S104 of FIG. 10.

FIG. 12 is a flow chart showing an example of the processing of the movement of the touch operation area M indicated by S104 of FIG. 10. The processing shown in S301 to S307 of FIG. 11 (position updating processing) is repeatedly executed in a predetermined cycle Tc until it is determined that the stop condition is satisfied in S308. In the following description, (i−1), (i), and (i+1) represent the position updating processing of calculating the velocity "V" and the acceleration "a" to which (i−1), (i), and (i+1) are added. For example, the velocity "V(i−1)" is the velocity "V" calculated in the previous position updating processing, and the velocity "V(i)" is the velocity "V" calculated in the current position updating processing.

If the device shaking operation is detected in S103 shown in FIG. 10, the position updating unit 11E refers to the map shown in FIG. 9, and obtains a friction coefficient μ(i) at the current position X(i) of the touch operation area M (S301). Further, the position updating unit 11E obtains the output of the acceleration sensor 14A (S302), and calculates the angle θx between the lateral axis Ax and the horizontal plane h of the touch screen 13 based on the output (S303). The position updating unit 11E calculates the acceleration a(i) of the touch operation area M based on the angle θx and the friction coefficient μ(i) (S304). The acceleration a(i) can be calculated, for example, by the following equation:

$$a(i)=G\times\sin(\theta x)-G\times\cos(\theta x)\times\mu(i) \qquad \text{Equation (1)}$$

Where "G" is the gravitational acceleration.

Further, the position updating unit 11E calculates the velocity V(i) of the touch operation area M (S305). The velocity V(i) can be calculated based on, for example, the acceleration a(i−1) calculated in the previous position updating processing (previous S304), the cycle Tc, and the velocity V(i−1) calculated in the previous position updating processing (previous S305). The velocity V(i) can be calculated, for example, by the following equation:

$$V(i)=V(i-1)+a(i-1)\times Tc \qquad \text{Equation (2)}$$

The position updating unit 11E calculates a position X(i+1) at which the touch operation area M is to be displayed next based on the current position X(i) and the velocity V(i) (S306). The position updating unit 11E may calculate the position X(i+1) at which the touch operation area M is to be displayed next based on the current position X(i), the velocity V(i), and the acceleration a(i). The position X(i+1) can be calculated, for example, by the following equation:

$$X(i+1)=X(i)+V(i)\times Tc+[a(i)^2]/2 \qquad \text{Equation (3)}$$

The position updating unit 11E displays the touch operation area M at the position X(i+1) (S307). The position updating unit 11E then determines whether the predetermined stop condition is satisfied (S308). The stop condition is, for example, that the velocity V(i) of the touch operation area M is lower than the threshold value. Another example of the stop condition is that the touch operation area M reaches the right or left position. If the stopping condition is not yet satisfied, the position updating unit 11E sets the calculated position X(i+1) to the current position X(i), sets the calculated velocity V(i) to the previous velocity V(i−1), sets the calculated acceleration a(i) to the previous acceleration a(i−1) (S309), and then returns to S301 to execute the subsequent processing again.

If the stop condition is satisfied in S308, the position updating unit 11E terminates the position updating processing and returns to the processing (S105) shown in the flow chart of FIG. 11.

Second Example

Figure 13A:
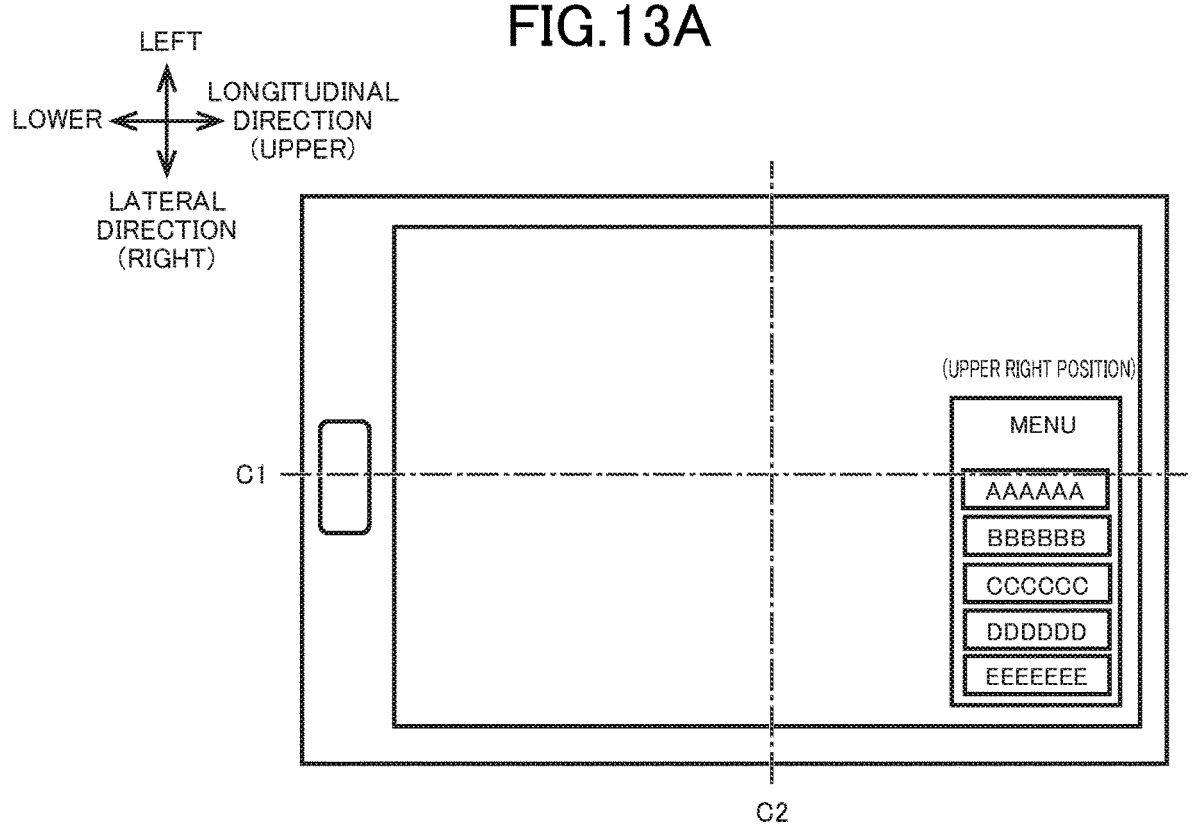
FIG. 13A is a diagram for explaining a position of the touch operation area when the electronic device is used in landscape orientation.
Figure 13B:
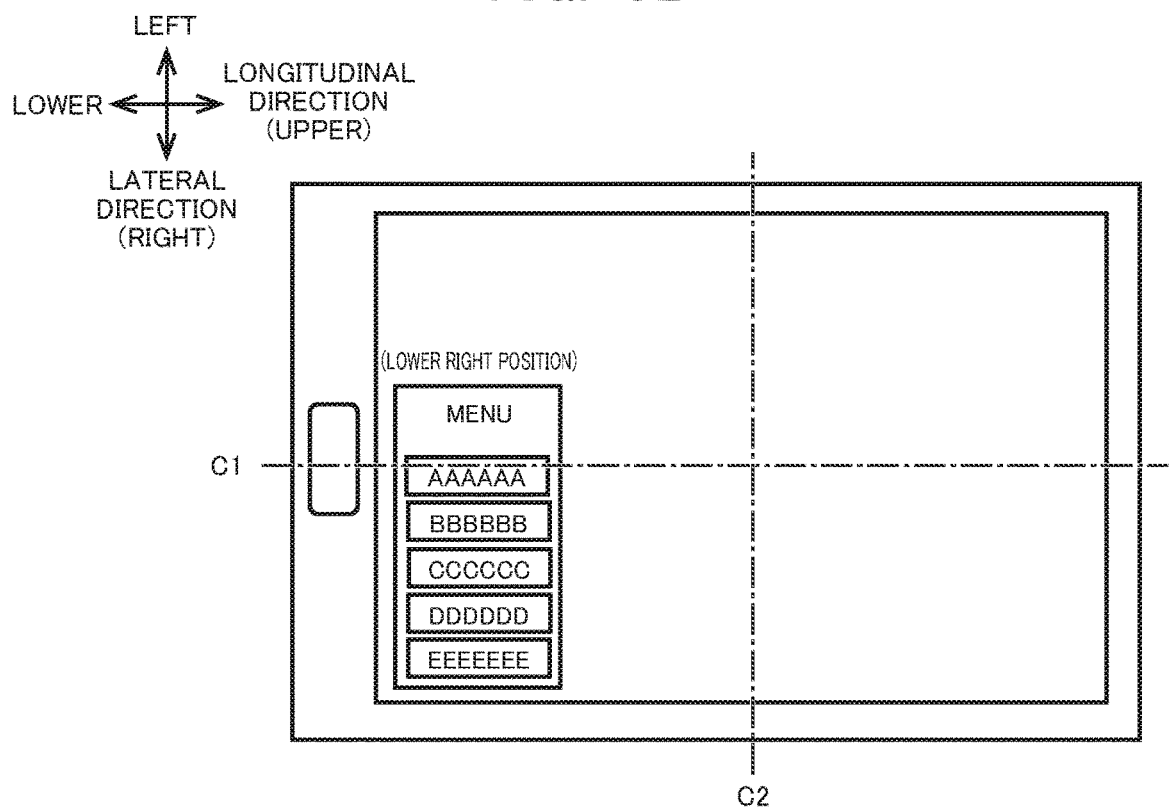
FIG. 13B is a diagram for explaining a position of the touch operation area when the electronic device is used in landscape orientation.

The electronic device 10 may be used not only in the posture shown in FIGS. 4A and 4B (longitudinal posture) but also in the posture shown in FIGS. 13A and 13B (posture rotated by 90 degrees from the longitudinal posture). In this case, as shown in these drawings, the position of the touch operation area M may be selected from the two positions (the upper right position and the lower right position) that are spaced apart in the longitudinal direction of the touch screen 13.

As shown in FIGS. 14A and 14B, the electronic device 10 may be used in a posture in which the electronic device 10 is upside down (upside-down posture). At this time, the screen displayed on the touch screen 13 (characters or images) may be displayed upside down. That is, the direction of the image (page) displayed on the touch screen 13 may be locked with respect to the electronic device 10. In this case as well, the touch operation area M may be displayed at a position close to the hand of the user. That is, the position of the touch operation area displayed at the lower portion of the touch screen 13 when the electronic device 10 is in the forward posture (the touch operation area M shown in FIGS. 4A and 4B) may be selected from the upper right position and the upper left position of the touch screen 13 as shown in FIGS. 14A and 14B when the electronic device 10 is in the reverse posture.

Figure 15:
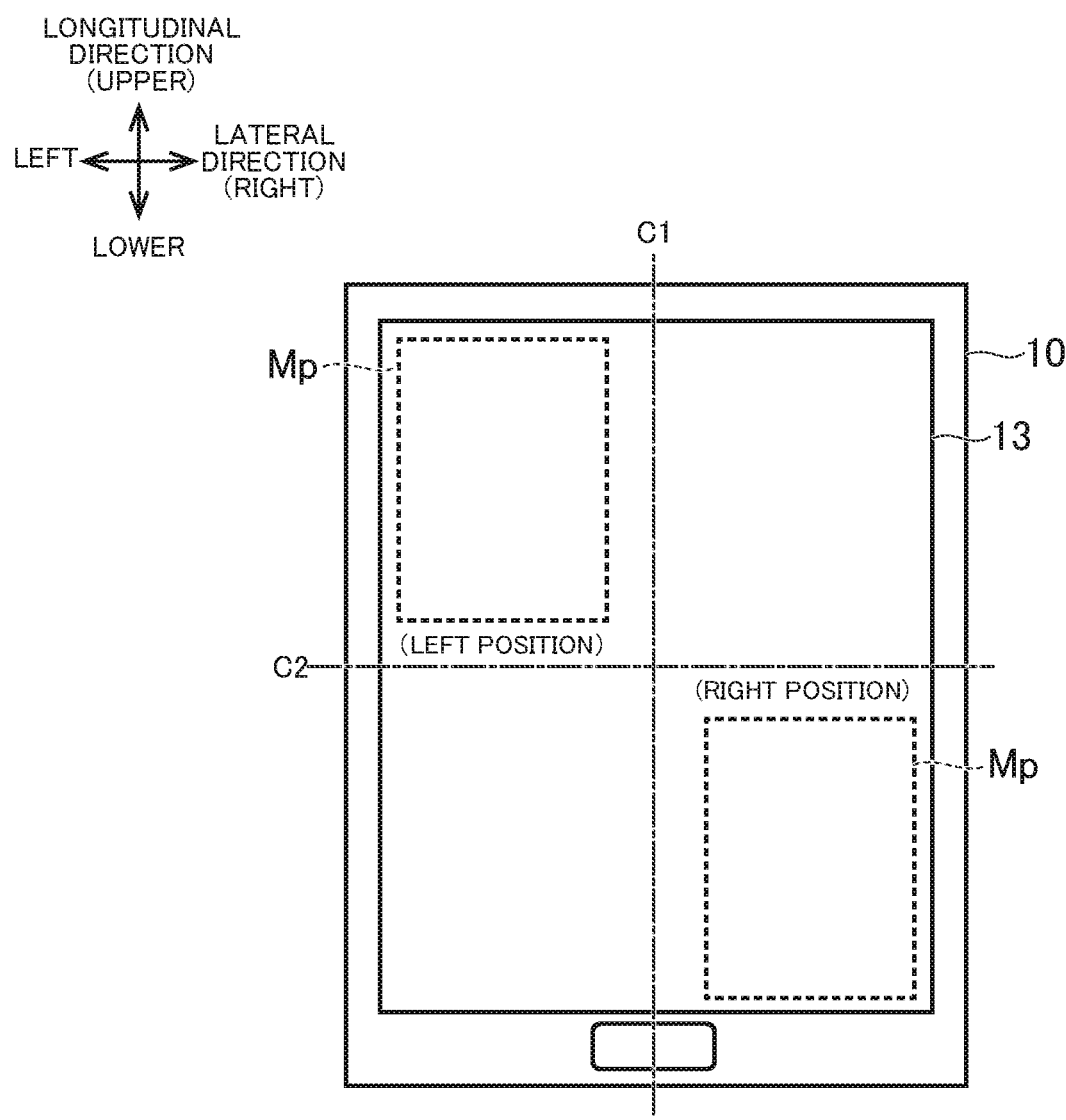
FIG. 15 is a diagram for explaining a variation of a position of the touch operation area.

As yet another example, when the electronic device 10 is used in the longitudinal posture as shown in FIG. 15, the touch operation area M may be also selected from the two positions apart in an oblique direction (such as the upper left direction or the lower left direction) corresponding to the inclination of the electronic device 10, and the touch operation area M may be movable in the oblique direction corresponding to the inclination of the electronic device 10. In FIG. 15, an area indicated by a broken line denoted by a symbol Mp is a candidate position of the touch operation area M.

Figure 16:
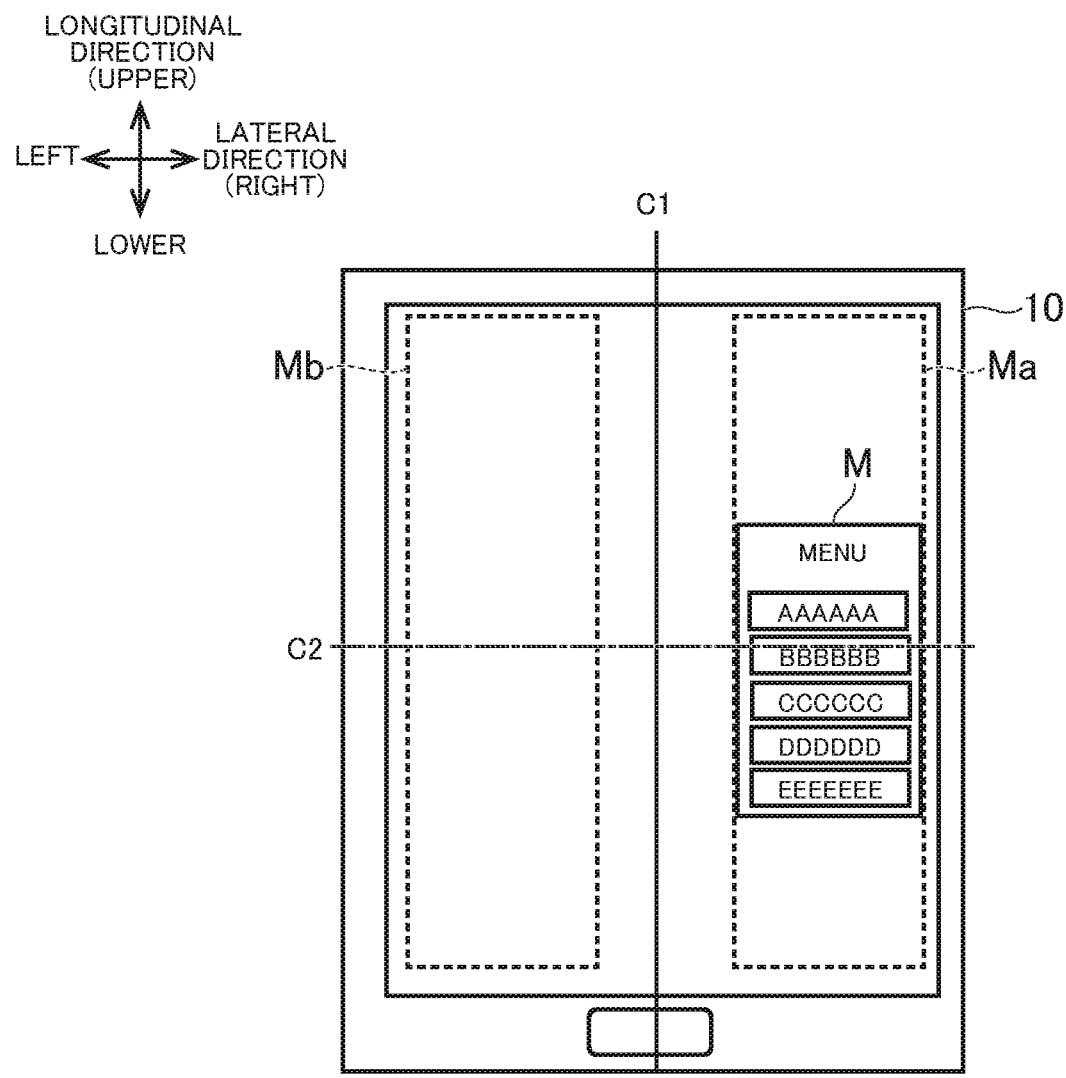
FIG. 16 is a diagram for explaining another variation of a position of the touch operation area.

As yet another example, when the electronic device 10 is used in the longitudinal posture, the touch operation area M may be also selected from two or more positions. For example, as shown in FIG. 16, an area corresponding to the inclination of the electronic device 10 may be selected from the area Ma on the right side and the area Mb on the left side of the touch screen 13, and, in the selected area, the touch operation area M may be displayed at a position corresponding to the inclination of the electronic device 10 in the longitudinal direction.

A second example will be described by taking examples of the displays shown in FIGS. 13A, 13B, 14A, 14B, 15, and 16 and the processing executed by the control unit 11 so as to enable the above-described movement of the touch operation area M in the oblique direction. In the following, the processing of the control unit 11 will be described focusing on the points different from the processing described above. The matters described referring to FIGS. 3 to 12 may be applied to the matters that are not described for the processing of the control unit 11 according to the second example.

Posture Detecting Unit

The posture detecting unit 11A (see FIG. 6) detects, for example, the inclination of the longitudinal axis Ay (see FIG. 7A) of the touch screen 13 to the horizontal plane h as the inclination of the electronic device 10 in addition to the inclination of the lateral axis Ax of the touch screen 13 to the horizontal plane h (the longitudinal axis Ay is the axis along the longitudinal direction of the touch screen 13).

The posture detecting unit 11A obtains a value representing the inclination of the longitudinal axis Ay based on, for example, the longitudinal acceleration detected by the output of the acceleration sensor 14A. Similarly to the value representing the inclination of the lateral axis Ax, this value may be an angle to the longitudinal axis Ay to the horizontal plane h, or an angle of the longitudinal axis Ay to the gravity direction, or the longitudinal acceleration.

Position Selecting Unit

For example, the position selecting unit 11D (see FIG. 6) selects a position to display the touch operation area M from the four positions defined in the touch screen 13 (specifically, the upper right position, the lower right position, the upper left position, the lower left position) based on the inclination of the lateral axis Ax to the horizontal plane h and the inclination of the longitudinal axis Ay to the horizontal plane h. The upper right position and the upper left position are positions away upward from the lower right position and the lower left position in the longitudinal direction, respectively. The upper right position and the lower right position are positions away rightward from the upper left position and the lower left position, respectively.

As shown in FIGS. 13A and 14A, the upper right position is, for example, a position defined in the right side of the center line C1 along the longitudinal direction and in the upper side of the center line C2 along the lateral direction. As shown in FIG. 15, the lower right position is, for example, a position defined in the right side of the center line C1 along the longitudinal direction and in the lower side of the center line C2 along the lateral direction. As shown in FIG. 15, the upper left position is, for example, a position defined in the left side of the center line C1 along the longitudinal direction and in the upper side of the center line C2 along the lateral direction. The lower left position is, for example, a position defined in the left side of the center line C1 along the longitudinal direction and in the lower side of the center line C2 along the lateral direction. The touch operation area M may partially overlap the center line C1 and/or the center line C2.

These four positions are not limited to the examples described here. The upper right position, the lower right position, the upper left position, and the lower left position may all be defined in the right side (or the left side) of the center line C1. In this case, the position of the touch operation area M is selected in the area in the right side (or left side) of the center line C1. Similarly, the upper right position, the upper left position, the lower right position, and the lower left position may all be defined in the upper side (or lower side) of the center line C2. In this case, the position of the touch operation area M is selected in the area above (or below) the center line C2. In these cases as well, the operability by a thumb can be improved as compared with the case where the position of the touch operation area M is fixed.

In a case where the right side (upper right position and lower right position) is lower than the left side (upper left position and lower left position) and the upper right position is lower than the lower right position due to the inclination of the electronic device 10, the position selecting unit 11D selects the upper right position as a position to display the touch operation area M. In other words, when comparing the heights of the four positions to the horizontal plane h in the lateral direction and the longitudinal direction, the position selecting unit 11D selects a position that is lower than the other three positions in both the lateral direction and the longitudinal direction as a position to display the touch operation area M.

As another example, as shown in FIG. 16, the position selecting unit 11D (see FIG. 6) may select an area corresponding to the inclination of the lateral axis Ax to the horizontal plane h from the area Ma on the right side and the area Mb on the left side of the touch screen 13, and, in the selected area, may select a position in the longitudinal direction corresponding to the inclination of the lateral axis Ay to the horizontal plane h.

Figure 17:
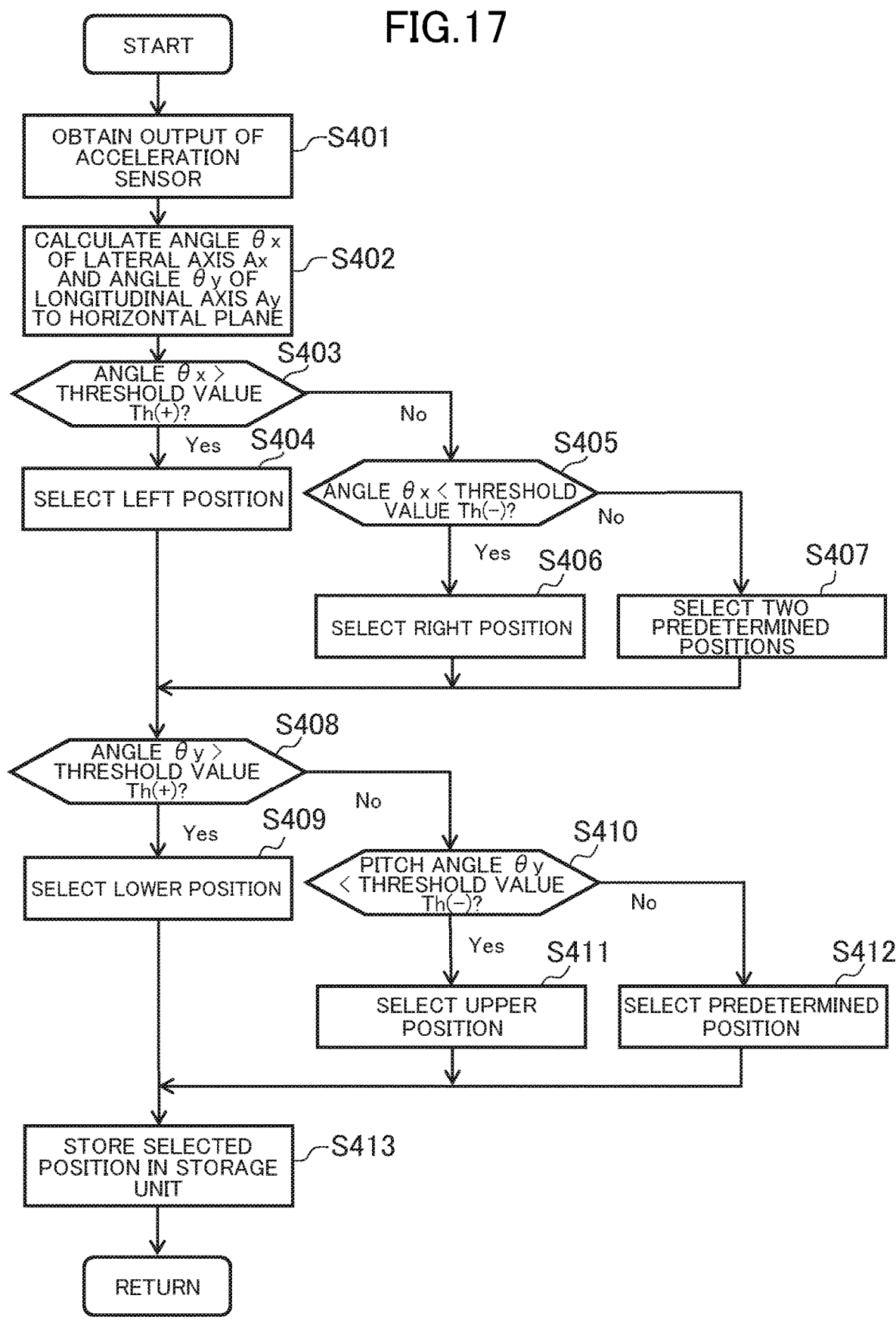
FIG. 17 is a flow chart showing a variation of processing of selecting a position of the touch operation area as indicated by S101 in the flow chart of FIG. 10.

FIG. 17 is a flow chart showing a variation of the selection processing of a position to display the touch operation area M as indicated by S101 in the flow chart of FIG. 10. Here, an example of selecting a position to display the touch operation area M from four positions (upper right position, upper left position, lower right position, lower left position) will be described.

The posture detecting unit 11A obtains the output of the acceleration sensor 14A (S401), and detects the inclination of the lateral axis Ax to the horizontal plane h and the inclination of the longitudinal axis Ay to the horizontal plane h based on the output of the acceleration sensor 14A (S402). Specifically, the posture detecting unit 11A calculates the angle θx (see FIG. 7B) between the horizontal plane h and the lateral axis Ax as a value representing the inclination of the lateral axis Ax to the horizontal plane h, for example, and calculates the angle θy between the horizontal plane h and the longitudinal axis Ay as a value representing the inclination of the longitudinal axis Ay to the horizontal plane h, for example.

Subsequently, the position selecting unit 11D determines whether the angle θx is greater than the positive threshold value Th(+) (S403). Here, if the angle θx is larger than the threshold value Th(+), the position selecting unit 11D selects, for example, either of two positions in the right side and two positions in the left side (e.g., the upper left position and the lower left position) as a candidate of the position to display the touch operation area M (S404). On the other hand, if the angle θx is not larger than the threshold value Th(+), the position selecting unit 11D determines whether the angle θx is smaller than the negative threshold value Th(−) (S405). Here, if the angle θx is smaller than the threshold value Th(−), the position selecting unit 11D selects the other of the two positions in the right side and the two positions in the left side (e.g., the upper right position and the lower right position) as candidates of the positions to display the touch operation area M (S406). If the angle θx is not smaller than the threshold value Th(−), that is, if the absolute value of the angle θx is smaller than the threshold value Th, the position selecting unit 11D selects two predetermined positions as candidates of the positions to display the touch operation area M (S407).

The two predetermined candidates may be, for example, the upper right position and the lower right position. Typically, there are more right-handed users, and thus the upper right position and the lower right position are selected as predetermined candidates so that the touch operation area M is displayed at a position desired for many users. Another example of the predetermined candidate may be a position between the upper right position and the upper left position, and a position between the lower right position and the lower left position.

Next, the position selecting unit 11D determines whether the calculated angle θy is larger than the positive threshold value Th(+) (S408). Here, if the angle θy is larger than the threshold value Th(+), for example, the position selecting unit 11D selects one of the lower position and the upper position (e.g., lower right position or lower left position defined in the lower side) from among the two positions selected as candidates of the position to display the touch operation area M in the above-described processing (S404, S406, S407) (S409). On the other hand, if the angle θy is not larger than the threshold value Th(+), the position selecting unit 11D determines whether the angle θy is smaller than the negative threshold value Th(−) (S410). If the angle θy is smaller than the threshold value Th(−), for example, the position selecting unit 11D selects the other one of the lower position and the upper position (e.g., upper right position or upper left position defined on the upper side) from among the two positions selected as candidates of the position to display the touch operation area M in the above-described processing (S404, S406, S407) (S411). On the other hand, if the angle ey is not smaller than the threshold value Th(−), that is, if the absolute value of the angle θy is smaller than the threshold value Th, the position selecting unit 11D selects two predetermined positions as candidates of the positions to display the touch operation area M (S412).

The predetermined position is, for example, the lower position of the two positions selected as candidates of the positions to display the touch operation area M. For example, if the upper right position and the lower right position are selected as the candidates of the positions to display the touch operation area M, the lower right position is selected in S412. As another example, if the position between the upper right position and the upper left position and the position between the lower right position and the lower left position are selected as the candidates for the position to display the touch operation area M, the position between the lower right position and the lower left position may be selected in S412.

When the position to display the touch operation area is selected in the processing of S409, S411, and S412, the position selecting unit 11D stores the selected position in the storage unit 12 (S413).

The processing executed by the control unit 11 is not limited to the example shown in FIG. 17. For example, the value representing the inclination of the lateral axis Ax of the touch screen 13 may not necessarily be the angle θx. This value may be the acceleration Fx itself acting in the lateral direction of the touch screen 13, for example. In this case, the position selecting unit 11D may compare the acceleration Fx with the threshold value in S403 and S405. Similarly, the value representing the inclination of the longitudinal axis Ay may not necessarily be the angle θy. This value may be the acceleration itself acting in the longitudinal direction of the touch screen 13, for example. In this case, the position selecting unit 11D may compare the longitudinal acceleration with the threshold value in S408 and S410. As yet another example, an angle between the lateral axis Ax and the gravity direction may be used as the value representing the inclination of the lateral axis Ax of the touch screen 13. Further, an angle between the longitudinal axis Ay and the gravity direction may be used as the value representing the inclination of the longitudinal axis Ay of the touch screen 13.

Further, the processing of comparing the inclination of the longitudinal axis Ay with the threshold value (S408 and S410) may be performed following the processing of comparing the inclination of the lateral axis Ax with the threshold value (S403 and S405) instead of the processing of selecting two positions in the right side or the left side (S404, S406, S407) as candidates of the positions to display the touch operation area M.

Position Updating Unit

In the second example as well, the touch operation area M may be movable in response to a shake operation. That is, the touch operation area M may be movable in a direction corresponding to the inclination of the electronic device 10 from a position where the touch operation area M is currently displayed (e.g., lower right position). In this case, the position updating unit 11E may execute the position updating processing, which is repeatedly executed at the predetermined cycle Tc, in each of the lateral direction and the longitudinal direction of the touch screen 13.

Figure 18:
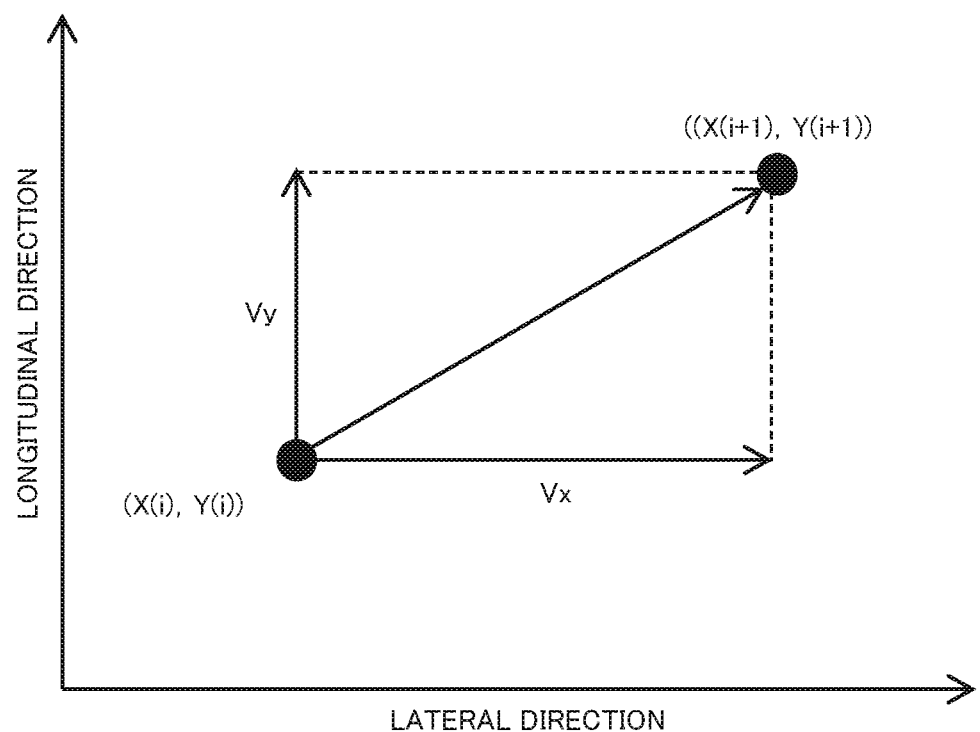
FIG. 18 is a diagram for explaining a velocity calculated in position updating processing.

FIG. 18 is a diagram for explaining the velocity calculated in the position updating processing according to the second example. As shown in FIG. 18, in single position updating processing, the position updating unit 11E may calculate the next position (the coordinate X(i+1)) in the lateral direction based on the velocity Vx of the touch operation area M in the lateral direction of the touch screen 13 and the current position (the coordinate X(i)) in the lateral direction. Further, in single position updating processing, the position updating unit 11E may calculate the next position (the coordinate Y(i+1)) in the longitudinal direction based on the velocity Vy of the touch operation area M in the longitudinal direction of the touch screen 13 and the current position (the coordinate Y(i)) in the longitudinal direction. With the position updating processing, the touch operation area M displayed on the touch screen 13 can be moved in any direction corresponding to the inclination of the electronic device 10 from the position where the touch operation area M is currently displayed.

Each of the velocities Vx and Vy of the touch operation area M may depend on the inclination of the electronic device 10 detected by the posture detecting unit 11A. For example, the position updating unit 11E may calculate the velocity Vx in the lateral direction based on the inclination of the lateral axis Ax to the horizontal plane h, and calculate the velocity Vy in the longitudinal direction based on the inclination of the longitudinal axis Ay to the horizontal plane h. This allows the touch operation area M to move like an object rolling on a downhill slope, thereby improving the intuitive operability of the application software.

The position updating unit 11E may calculate the velocities Vx and Vy of the touch operation area M based on the pseudo friction defined in the touch screen 13. More specifically, the position updating unit 11E may calculate the velocity Vx of the touch operation area M based on the inclination of the lateral axis Ax to the horizontal plane h and the friction, and calculate the friction and the velocity Vx of the touch operation area M based on the inclination of the longitudinal axis Ay to the horizontal plane h. In this way, when the user reduces the inclination of the electronic device 10, for example, the resistance to the movement of the touch operation area can be relatively increased and the velocity of the touch operation area M can be reduced. This allows the user to stop the touch operation area M at a desired position (coordinates) in both the lateral direction and the longitudinal direction.

The pseudo friction coefficient for obtaining friction may be defined in the touch screen 13. The friction and the friction coefficient are expressed, for example, by the following equations:

$$\text{Lateral frictions} = G \times \cos(\theta x) \times \mu \qquad \text{Equation (4a)}$$

$$\text{Longitudinal frictions} = G \times \cos(\theta y) \times \mu \qquad \text{Equation (4b)}$$

In the equations, "G" is gravitational acceleration, "θx" is the angle of the lateral axis Ax to the horizontal plane h, "θy" is the angle of the lateral axis Ax to the horizontal plane h, and "μ" is the friction coefficient.

The friction or the friction coefficient may be determined according to the position (coordinates) on the touch screen 13. For example, the position updating unit 11E may refer to a map that associates the friction or friction coefficient with the position (coordinates) on the touch screen 13 and obtain the friction or friction coefficient corresponding to the current position of the touch operation area M. The position updating unit 11E may then calculate the velocities Vx and Vy of the touch operation area M based on the obtained friction or friction coefficient and the inclination of the electronic device 10.

Figure 19:
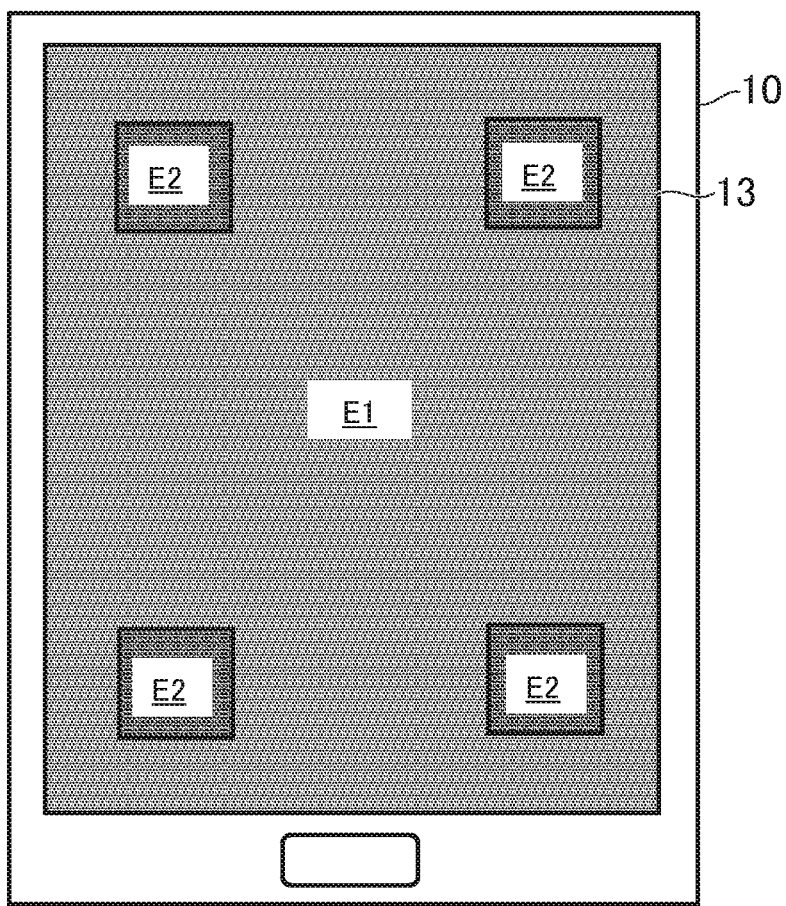
FIG. 19 is a diagram illustrating an example of a map associating a position on the touch screen with a friction coefficient.

FIG. 19 is a diagram illustrating an example of the map. In areas E2 corresponding to the four positions where the touch operation area M may be displayed, relatively high friction coefficient is defined, and relatively low friction coefficient is defined in the other area E1. According to such a friction coefficient, the velocity of the touch operation area M decreases as the touch operation area M approaches the upper right position, the lower right position, the upper left position, or the lower left position. The friction coefficient is also set in the area E1, and thus the user adjusts the inclination of the electronic device 10 during the movement of the touch operation area M to thereby stop the touch operation area M at any position between the four positions. The friction coefficient defined in the area E1 may be 0.

Figure 20:
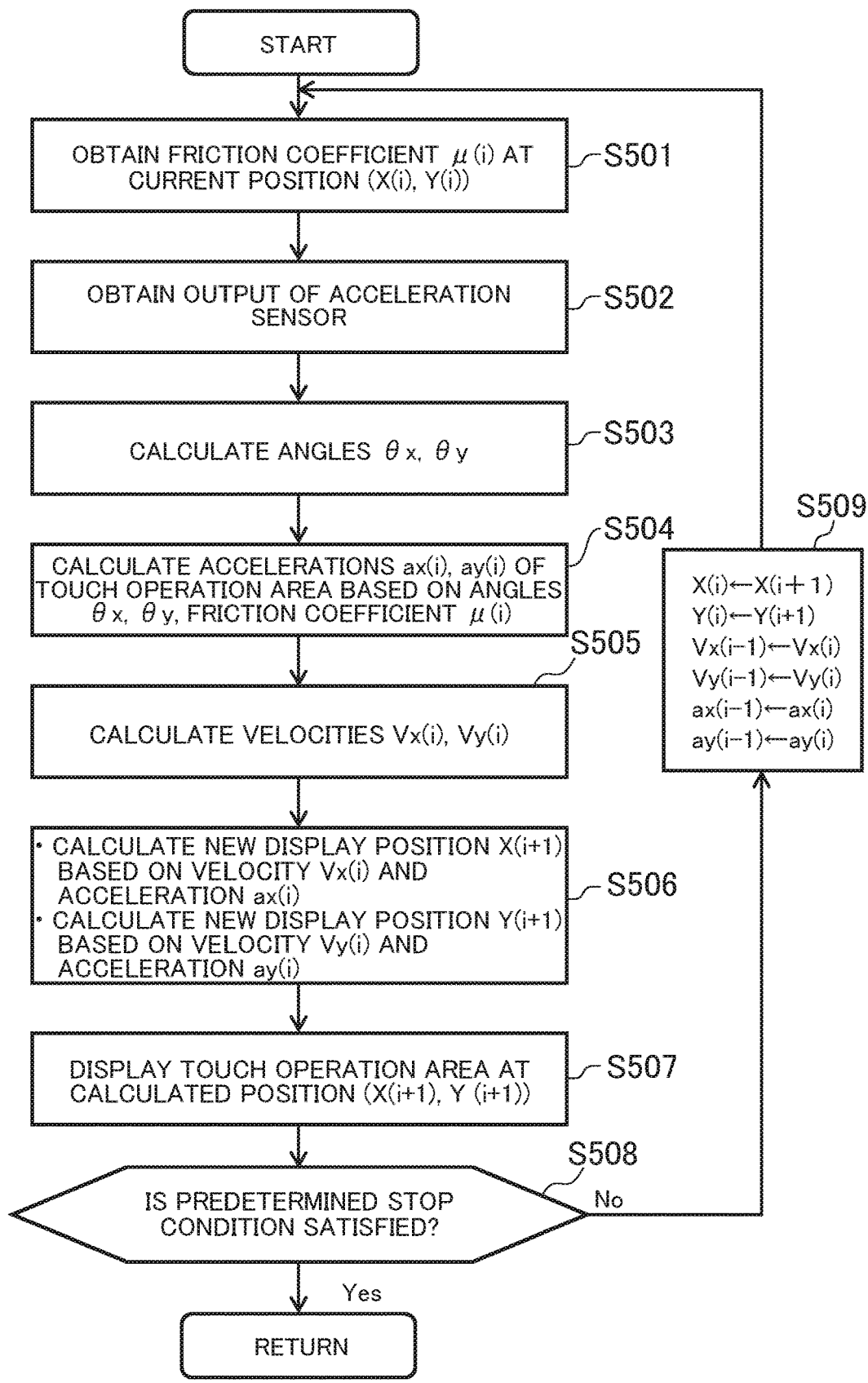
FIG. 20 is a flow chart showing a variation of processing relating to movement of the touch operation area indicated by S104 of FIG. 10.

FIG. 20 is a flow chart showing a variation of the processing relating to the movement of the touch operation area M indicated by S104 of FIG. 10. The processing shown in FIG. 20 differs from the processing shown in the flow chart of FIG. 12 in that the position in the longitudinal direction of the touch screen 13, velocity, and acceleration are calculated, and is the same in other aspects.

When the device shake operation is detected, the position updating unit 11E refers to the map shown in FIG. 19, and obtains a friction coefficient μ(i) at the current position (X(i), Y(i)) of the touch operation area M (S501). Further, the position updating unit 11E obtains the output of the acceleration sensor 14A (S502), and calculates the angle θx between the lateral axis Ax of the touch screen 13 and the horizontal plane h and the angle θy between the longitudinal axis Ay and the horizontal plane h based on the output (S503). The position updating unit 11E calculates the acceleration ax(i) of the touch operation area M based on the angle θx and the friction coefficient μ(i), and calculates the acceleration ay(i) of the touch operation area M based on the angle θy and the friction coefficient μ(i) (S504). For example, the following equations can be used for the calculation of the accelerations ax(i) and ay(i):

$$ax(i) = G \times \sin(\theta x) - G \times \cos(\theta x) \times \mu(i) \qquad \text{Equation (5a)}$$

$$ay(i) = G \times \sin(\theta y) - G \times \cos(\theta y) \times \mu(i) \qquad \text{Equation (5b)}$$

Further, the position updating unit 11E calculates the velocities Vx(i), Vy(i) of the touch operation area M (S505). The velocity Vx(i) can be calculated based on, for example, the acceleration ax(i−1) calculated in the previous position updating processing (previous S504), the cycle Tc, and the velocity Vx(i−1) calculated in the previous position updating processing (previous S505). Similarly, the velocity Vy(i) can be calculated based on, for example, the acceleration ay(i−1) calculated in the previous position updating processing (previous S504), the period Tc, and the velocity Vy(i−1) calculated in the previous position updating processing (previous S505). For example, the following equations can be used for the calculation of the velocities Vx(i) and Vy(i):

$$Vx(i)=Vx(i-1)+ax(i-1)\times Tc \quad \text{Equation (6a)}$$

$$Vy(i)=Vy(i-1)+ay(i-1)\times Tc \quad \text{Equation (6b)}$$

The position updating unit 11E calculates the position X(i+1) at which the touch operation area M is to be displayed next based on the current position X(i) and the velocity Vx(i) in the lateral direction, and calculates the position Y(i+1) at which the touch operation area M is to be displayed next based on the current position Y(i) and the velocity Vy(i) in the longitudinal direction (S506). For example, the following equations can be used for the calculation of the next position (X(i+1)·Y(i+1)):

$$X(i+1)=X(i)+Vx(i)\times Tc+[ax(i)^2]/2 \quad \text{Equation (7a)}$$

$$Y(i+1)=Y(i)+Vy(i)\times Tc+[ay(i)^2]/2 \quad \text{Equation (7b)}$$

As described above, the velocity and the position of the touch operation area M in the lateral direction are calculated and the velocity and the position of the touch operation area M in the longitudinal direction are calculated by the processing of S505 and S506, and thus the touch operation area M can be moved in the oblique direction (e.g., the upper left direction or the lower left direction) along the touch screen 13.

The position updating unit 11E displays the touch operation area M at the position (X(i+1), Y(i+1)) (S507). The position updating unit 11E then determines whether the predetermined stop condition is satisfied (S508). Here, the stop condition is that each of the velocities Vx(i) and Vy(i) of the touch operation area M becomes lower than the threshold value, for example. Another example of the stop condition is that the touch operation area M reaches any one of the right lower position, the left lower position, the right upper position, and the left upper position.

If the stop condition is not yet satisfied, the position updating unit 11E sets the calculated position (X(i+1), Y(i+1)) to the current position (X(i), Y(i)), sets the calculated velocities Vx(i), Vy(i) to the previous velocities Vx(i−1), Vy(i−1), sets the calculated accelerations ax(i), ay(i) to the previous accelerations ax(i−1), ay(i−1), and then returns to S501 (S509) to execute the subsequent processing again. If the stopping condition is satisfied in S508, the position updating unit 11E terminates the position updating processing and returns to the processing (S105) shown in the flow chart of FIG. 10.

As described above, the inclination of the lateral axis Ax to the horizontal plane h may be represented by the acceleration acting on the electronic device 10 in the direction of the lateral axis Ax. Further, as described above, the inclination of the longitudinal axis Ay to the horizontal plane h may be represented by the acceleration acting on the electronic device 10 in the direction of the longitudinal axis Ay. In this case, the accelerations ax(i), ay(i) of the touch operation area M may be calculated by the acceleration acting on the electronic device 10. For example, the following equations may be used instead of the equations (5a) and (5b).

$$ax(i)=Gx-kx\times\mu(i) \quad \text{Equation (8a)}$$

$$ay(i)=Gy-ky\times\mu(i) \quad \text{Equation (8b)}$$

In the equations (8a) and (8b), Gx and Gy are the accelerations acting on the electronic device 10 in the lateral direction and the acceleration acting on the electronic device in the longitudinal direction, respectively. The coefficients kx and ky decrease as the accelerations Gx, Gy increase. Accordingly, as the accelerations Gx, Gy are reduced, the ratio of the friction coefficient μ(i) becomes relatively large and the accelerations ax(i), ay(i) of the touch operation area M are reduced. The above-described equations (6a) to (7b) may be used to calculate the velocity and the position of the touch operation area M.

Summary

As described above, the control unit 11 includes, as its function, the posture detecting unit 11A for detecting the inclination of the electronic device 10 to the horizontal plane h perpendicular to the gravitational direction by using the output of the sensor 14A mounted on the electronic device 10, and the position selecting unit 11D for selecting a position of a touch operation area in an image to be displayed in the touch screen. The touch operation area M is an area for receiving the touch operation to the touch screen 13. The position selecting unit 11D selects a position to display the touch operation area M from the right position and the left position away in the lateral direction of the touch screen 13 based on the inclination of the lateral axis Ax to the horizontal plane h. When the electronic device 10 is operated with one hand, such configuration enables the touch operation area M to be displayed at an appropriate position by an intuitive operation of the user. As described above, the control unit 11 includes, as its function, the operation detecting unit 11B for detecting a shake operation performed on the electronic device 10, the posture detecting unit 11A for detecting a posture of the electronic device 10, and the position updating unit 11E for moving the touch operation area M, which is an area for receiving a touch operation to the touch screen 13 and is displayed on the touch screen 13, in the direction corresponding to the posture of the electronic device 10 when the shake operation is detected. This configuration allows the user to move the touch operation area in a direction desired by the user by a simple operation that can be performed with one hand.

Variation

The electronic device, the program, and the control method of the electronic device proposed in the present disclosure are not limited to the examples implemented by the electronic device 10 described above.

For example, the position updating unit 11E may not be provided to the control unit 11 having the position selecting unit 11D. In contrast, the position selecting unit 11D may not be provided to the control unit 11 having the position updating unit 11E. In this case, the touch operation area M may be initially displayed at a predetermined position (e.g., right position, right lower position, upper right position).

In the processing of the position selecting unit 11D, the threshold value to be compared with the inclinations of the axes Ax and Ay to the horizontal plane h may not necessarily be used. In this case, for example, the position to display the touch operation area M may be selected in accordance with the signs (+) and (−) of the values representing the inclinations of the axes Ax and Ay to the horizontal plane h.

The processing of calculating the velocity of the touch operation area M using the friction, the friction coefficient, and the inclination of the electronic device 10 may be executed in an electronic device that does not detect a shake operation. That is, the processing of calculating the velocity of the touch operation area M using the friction, the friction coefficient, and the inclination of the electronic device 10 may be executed independently of the shake operation.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A non-transitory information storage medium storing a program that causes a computer mounted on an electronic device including a touch screen to:
    detect inclination of the electronic device to a horizontal plane perpendicular to a gravity direction by using output of a sensor mounted on the electronic device;
    select a position of a touch operation area in an image displayed in the touch screen, to be displayed in the touch screen, the touch operation area being a partial region in the touch screen
    for receiving a touch operation to the touch screen; and
    in the selection of the position to display the touch operation area, select the position to display the touch operation area from at least two positions, the at least two positions being based on the inclination of the electronic device to the horizontal plane, wherein
    the at least two positions include a first position and a second position that are apart from each other due to the inclination of the electronic device,
    in the selection of the position to display the touch operation area, the second position is selected based on the second position being lower than the first position due to the inclination of the electronic device, and the first position is selected based on the first position being lower than the second position due to the inclination of the electronic device,
    the detection of the inclination is made before displaying the touch operation area in the touch screen, and
    the selection of the position to display the touch operation area is made before displaying the touch operation area in the touch screen.

2. The non-transitory information storage medium storing the program according to claim 1, wherein
    the first position and the second position are apart from each other in a first direction,
    the first position is defined in one side of a center line along a second direction, which passes through a center of the touch screen in the first direction and is one direction of a longitudinal direction and a lateral direction of the touch screen, and
    the second position is defined in a side opposite to the first position with respect to the center line.

3. The non-transitory information storage medium storing the program according to claim 1, wherein
    in the selection of the position to display the touch operation area, the position to display the touch operation area is selected based on the inclination of the electronic device detected in response to a predetermined touch operation performed on the touch screen.

4. The non-transitory information storage medium storing the program according to claim 1, wherein
    in the selection of the position to display the touch operation area, the position to display the touch operation area is selected based on the inclination of the electronic device detected in response to a touch operation that instructs an operating system of the computer to activate the program.

5. The non-transitory information storage medium storing the program according to claim 1, wherein
    the program causes the computer to selectively display a first image and a second image on the touch screen, the second image including the touch operation area, and
    in the selection of the position to display the touch operation area, the position to display the touch operation area is selected based on the inclination of the electronic device detected in response to a touch operation for instructing a change from the first image to the second image.

6. The non-transitory information storage medium storing the program according to claim 1, wherein
    in the detection of the inclination of the electronic device using the output of the sensor, inclination of a first axis to the horizontal plane is detected as first inclination and inclination of a second axis to the horizontal plane is detected as second inclination, the first axis being along a first direction, which is one of a longitudinal direction and a lateral direction of the touch screen, the second axis being along a second direction, which is the other of the longitudinal direction and the lateral direction of the touch screen,
    in the selection of the position to display the touch operation area, the position to display the touch operation area is selected from the first position, the second position, a third position, and a fourth position based on the first inclination or the second inclination,
    the first position and the second position are apart from each other in the first direction,
    the third position and the fourth position are apart from each other in the first direction, and
    the third position and the fourth position are apart from the first position and the second position in the second direction.

7. The non-transitory information storage medium storing the program according to claim 6, wherein p1 select, based on an angle of the first inclination being greater than a first threshold value, two of the first position, second position, third position, and fourth position as candidate positions for the position to display the touch operation area, and
    select, based on the angle of the first inclination being less than the first threshold value, two of the other of the first position, second position, third position, and fourth position are selected as the candidate positions for the position to display the touch operation area.

8. The non-transitory information storage medium storing the program according to claim 7, wherein
    select, based on an angle of the second inclination being greater than a second threshold value, an upper position from the candidate positions as the position to display the touch operation area, and
    select, based on the angle of the second inclination being less than a second threshold value, a lower position from the candidate positions as the position to display the touch operation area.

9. The non-transitory information storage medium storing the program according to claim 1, wherein the touch operation area is an area in which one or more selection candidates that are selectable by a user is displayed.

10. The non-transitory information storage medium storing the program according to claim 9, wherein the one or more selection candidates include at least one of a menu item, a button icon for receiving a user command, or an icon associated with a specific function.

11. The non-transitory information storage medium storing the program according to claim 1, wherein a plurality of touch operation area are simultaneously displayed in the touch screen.

12. A display control method of a touch screen provided in an electronic device, comprising:
- detecting inclination of the electronic device to a horizontal plane perpendicular to a gravity direction by using output of a sensor mounted on the electronic device;
- selecting a position of a touch operation area, in an image displayed in the touch screen, to be displayed in the touch screen, the touch operation area being a partial region in the touch screen for receiving a touch operation to the touch screen; and
- in the selection of the position to display the touch operation area, selecting the position to display the touch operation area from at least two positions, the at least two positions being based on the inclination of the electronic device to the horizontal plane, wherein
- the at least two positions include a first position and a second position that are apart from each other due to the inclination of the electronic device, and in the selection of the position to display the touch operation area, the second position is selected based on the second position being lower than the first position due to the inclination of the electronic device, and the first position is selected based on the first position being lower than the second position due to the inclination of the electronic device,
- the detection of the inclination is made before displaying the touch operation area in the touch screen, and
- the selection of the position to display the touch operation area is made before displaying the touch operation area in the touch screen.

13. A display system comprising:
- a touch screen mounted on an electronic device and including a display device and a touch sensor;
- a sensor that outputs a signal corresponding to a posture of the electronic device; and
- a control device that displays a touch operation area in the touch screen, the touch operation area being a partial region in the touch for receiving a touch operation to the touch screen, wherein
- the control device includes at least one processor that detects inclination of the electronic device to a horizontal plane perpendicular to a gravity direction using output of the sensor mounted on the electronic device and selects a position of the touch operation area in an image to be displayed in the touch screen, and
- in the selection of the position to display the touch operation area, the control device selects the position to display the touch operation area from at least two positions, the at least two positions being based on the inclination of the electronic device to the horizontal plane, wherein
- the at least two positions include a first position and a second position that are apart from each other due to the inclination of the electronic device, and in the selection of the position to display the touch operation area, the second position is selected based on the second position being lower than the first position due to the inclination of the electronic device, and the first position is selected based on the first position being lower than the second position due to the inclination of the electronic device,
- the detection of the inclination is made before displaying the touch operation area in the touch screen, and
- the selection of the position to display the touch operation area is made before displaying the touch operation area in the touch screen.

* * * * *